(12) United States Patent
Ohazulike et al.

(10) Patent No.: US 10,275,407 B2
(45) Date of Patent: Apr. 30, 2019

(54) APPARATUS AND METHOD FOR EXECUTING AN AUTOMATED ANALYSIS OF DATA, IN PARTICULAR SOCIAL MEDIA DATA, FOR PRODUCT FAILURE DETECTION

(71) Applicant: Hitachi, Ltd., Tokyo (JP)

(72) Inventors: Anthony Emeka Ohazulike, Maidenhead (GB); Andrea Tomatis, Maidenhead (GB); Lan Lin, Maidenhead (GB)

(73) Assignee: Hitachi, Ltd., Tokyo (JP)

( * ) Notice: Subject to any disclaimer, the term of this patent is extended or adjusted under 35 U.S.C. 154(b) by 286 days.

(21) Appl. No.: 15/265,971

(22) Filed: Sep. 15, 2016

(65) Prior Publication Data

US 2017/0091289 A1 Mar. 30, 2017

(30) Foreign Application Priority Data

Sep. 30, 2015 (EP) .................................. 15187745

(51) Int. Cl.
*G06F 17/30* (2006.01)
*G06F 16/2458* (2019.01)
(Continued)

(52) U.S. Cl.
CPC ............ *G06F 16/2465* (2019.01); *G06F 7/20* (2013.01); *G06F 17/277* (2013.01);
(Continued)

(58) Field of Classification Search
USPC ........................................................ 707/776
See application file for complete search history.

(56) References Cited

U.S. PATENT DOCUMENTS 6,065,001 A * 5/2000 Ohkubo .............. G06F 17/3071
707/700
2007/0282892 A1* 12/2007 Probst .................... G06F 17/27
(Continued)

FOREIGN PATENT DOCUMENTS

JP 2004-21605 A 1/2004
WO 2013/024338 A1 2/2013

OTHER PUBLICATIONS

Japanese Office Action received in corresponding Japanese Application No. 2016-189156 dated Aug. 8, 2017.
(Continued)

*Primary Examiner* — Hung T Vy
(74) *Attorney, Agent, or Firm* — Mattingly & Malur, PC

(57) ABSTRACT

An apparatus and a method for executing an automated analysis of analysis input data (e.g. social media data and/or On-Board-Diagnosis data) for product failure detection is proposed. Data analysis processing is performed, including: word count processing to determine word count numbers indicative of occurrence frequencies for keywords of a database in user-created text documents of the social media data; correlation determination processing to determine, for each of a plurality of keyword pairs, a respective correlation coefficient; correlation-link identification processing to identify correlation-linked keyword pairs for which the determined correlation coefficient exceeds a correlation threshold; and correlation group identification processing to identify correlation groups of keywords based on the identified correlation-linked keyword pairs; and, if one or more correlation groups of keywords are identified, analysis result data indicative of at least one of the one or more identified correlation groups of keywords is output.

13 Claims, 13 Drawing Sheets

(51) Int. Cl.
　　*G06F 7/20* 　　(2006.01)
　　*H04L 12/58* 　　(2006.01)
　　*G06F 17/27* 　　(2006.01)
　　*G06Q 10/00* 　　(2012.01)

(52) U.S. Cl.
　　CPC ....... *G06F 17/30539* (2013.01); *G06Q 10/20* (2013.01); *H04L 51/32* (2013.01)

(56) References Cited

U.S. PATENT DOCUMENTS

| | | | |
|---|---|---|---|
| 2010/0119053 A1 | 5/2010 | Goeldi | |
| 2011/0113047 A1* | 5/2011 | Guardalben | G06F 17/30905 707/754 |
| 2015/0058344 A1 | 2/2015 | Bhatia et al. | |
| 2015/0089409 A1 | 3/2015 | Asseily et al. | |
| 2015/0199438 A1 | 7/2015 | Talyansky et al. | |

OTHER PUBLICATIONS

Kokogawa, T. et al., "Organization Technology of Informal Information", IEICE Technical Report, The Institute of Electronics, Information and Communication Engineers, Jul. 24, 1998, pp. 31-36, vol. 98, No. 200.

Alan S. Abrahams et al., "What's buzzing in the blizzard of buzz? Automotive component isolation in social media postings", ResearchGate, Article in Decision Support Systems, Dec. 30, 2012. https://www.researchgate.net/publication/259119044.

Graham Williams, "Data Mining with Rattle and R", ISBN 978-1-4419-9889-7, Springer Science & Business Media, LLC, 2011.

Albert Bifet et al., "MOA-TweetReader: Real-Time Analysis in Twitter Streaming Data", Discovery Science, Springer Berlin Heidelberg, Oct. 5, 2011, pp. 46-60.

Extended European Search Report received in corresponding European Application No. 15187745.3 dated Dec. 4, 2015.

* cited by examiner

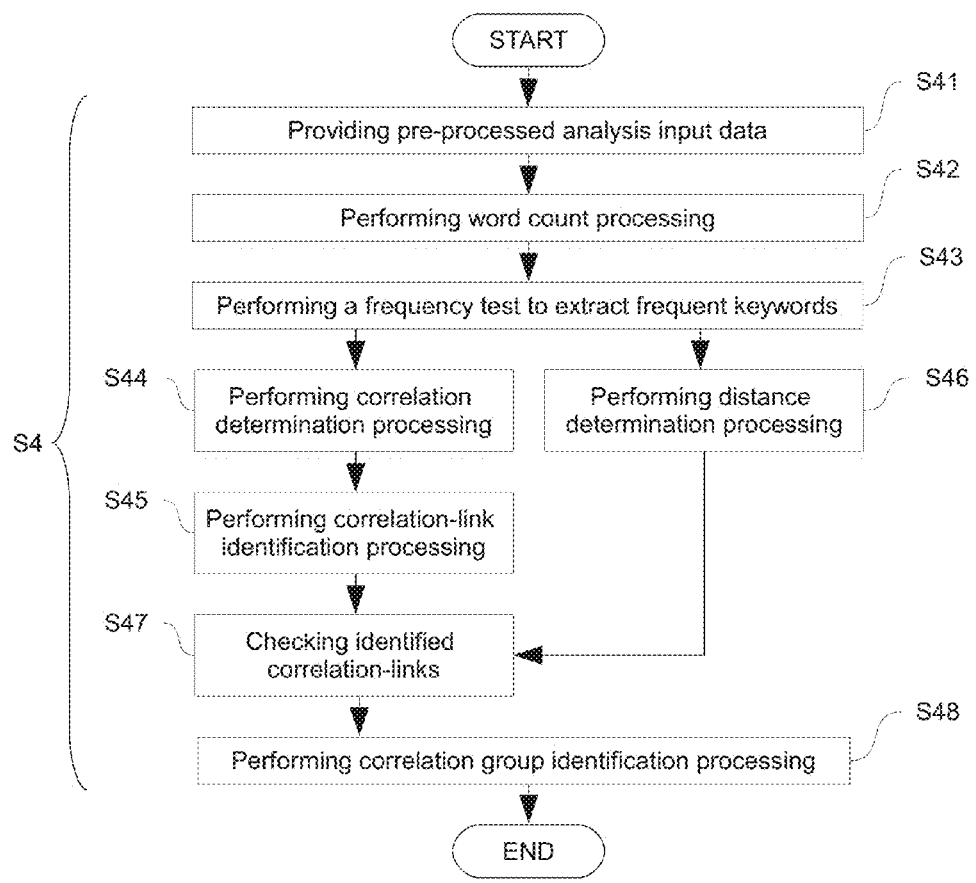

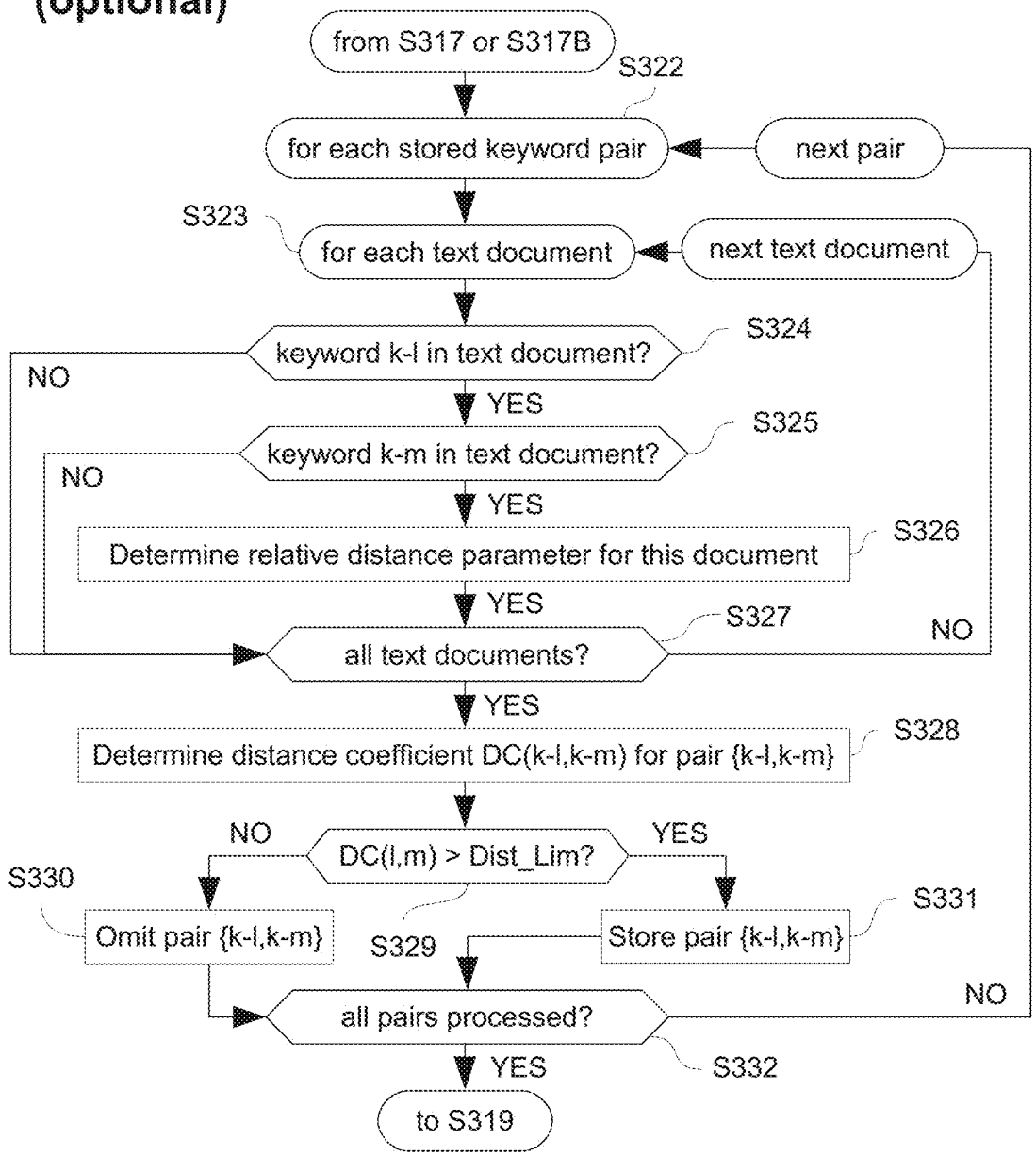
Fig. 4D (optional)

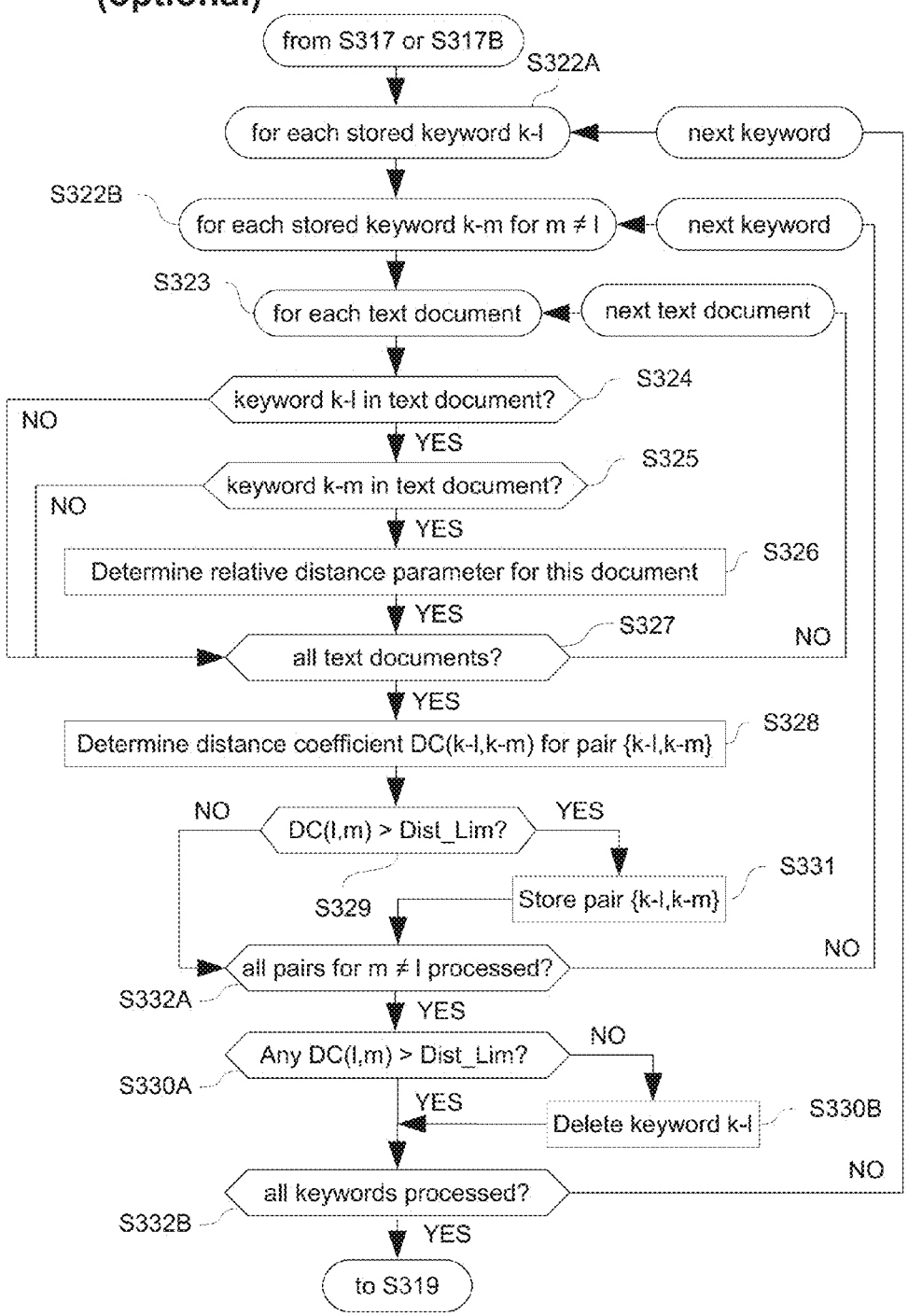

APPARATUS AND METHOD FOR EXECUTING AN AUTOMATED ANALYSIS OF DATA, IN PARTICULAR SOCIAL MEDIA DATA, FOR PRODUCT FAILURE DETECTION

The present disclosure relates to methods and apparatuses for executing automated data analysis, in particular social media data and/or On-Board-Diagnosis data, and in particular for the purpose of production failure detection preferably in the automotive industry.

BACKGROUND

Every year, original equipment manufacturers (OEMs) in the automobile industries loose a huge amount of money due to recalls of vehicles with safety related issues. As long as the fault is not known to the OEMs, these vehicles are being produced and shipped to the market. So, by the time the problem is known to the OEMs, the number of affected vehicle in the market is already very high, and so are the costs of recall and fixing of these affected vehicles. Therefore, OEMs are seeking for a quick and reliable way of detecting problematic spare parts to reduce the costs of recalls.

The article "What's buzzing in the blizzard of buzz? Automotive component isolation in social media postings" by Alan S. Abrahams, Jian Jiao, Weiguo Fan, Alan Wang, Zhongju Zhang in Decision Support Systems—55 (2013) 871-882—discusses analysis of social media data in the context of the automotive field. In the article, a set of automotive smoke words that have higher relative prevalence in defects vs. non-defects, and in safety issues vs. other postings have been identified. This set of smoke words is used to automatically identify posts on social data which might contain defects. Additionally, in the article the authors seem to classify the posting with respect to the category of component which is affected by the defect (e.g. air conditioning, transmission etc.). The article, even if it seems to detect to which category the defect belongs to, it fails recognizing the nature and the correlated terms which leads to recognize potential cause of the defect. Furthermore, the article seems to rely on word stemming techniques, but these do not appear suitable for fault analysis and failure detection, since the stemming techniques tend to lump a lot of different words into one root word, which will mislead the auto product managers. This can already be seen from the results of the article in trying to understand and explain some of the words that were stemmed so badly that you have to consult the original raw text to understand what the original words are. This is not possible, when the data size is overwhelming.

US2015/0058344 A1 relates to methods and systems for monitoring and analysing social media data, and proposes a method to classify words or sentences, after being tokenized, based on sentimental analysis. US2015/0058344 A1 seems to represent a generic approach for social data analysis, but it is not able to detect correlation between terms which might be used to determine specific meaning or cause effect relationships.

For data mining in general, please refer to the textbook "Data Mining with Rattle and R" by author Graham Williams.

SUMMARY

In view of the above, this present disclosure delves into the wealth of information available in the social media and retrieved On-Board-Diagnosis (OBD or OBDII) data, and describes a method of early discovery of a faulty vehicle parts, and possible causes of the parts failure by analysing information available in the analysis input data such as e.g. social media data and/or On-Board-Diagnosis (OBD or OBDII) data.

It is an object to propose aspects and methods for data analysis that is appropriate, reliable and efficient to be used in early detection of product failures and/or part failures to avoid late and cost intensive product recalls, in particular in the automotive field.

According to some embodiments, for solving the above-described technical object, there is proposed a method for an automated analysis of analysis input data according to claim 1 and an apparatus for executing an automated analysis of analysis input data according to claim 15.

Also, there is proposed a computer program product according to claim 14, adapted to cause a computer or computer system to perform an automated analysis of analysis input data. Dependent claims and the combinations of two or more dependent claims relate to exemplary and preferred embodiments.

In the most preferable aspects, the embodiments shall be applied to the automotive industry, and in particular to failure detection based on On-Board-Diagnosis data and/or social media analysis for early detection of recall situations to avoid high costs. However, it is to be noted that the aspects and embodiments may also be applied to different fields.

According to some preferred exemplary aspects, it is possible to propose a process or sub-processes to collect, process, analyse and/or validate information from relevant On-Board-Diagnosis data and/or social media data and to derive insights about a given product defect as soon as the user starts talking about it. As the analysis input data comes in, it is analysed and information (like auto part defect/failure, level of severity of defects) can be extracted, e.g., using specialised automobile dictionaries which may additionally be trained using machine learning in some embodiments.

Further, in some exemplary embodiments, with a predefined correlation threshold, multiple correlations can be identified and be performed to match the detected failed parts with the causes and the geo location where it occurred e.g. based on keywords of different categories. The correlation(s) can be validated in some exemplary embodiments, using a parallel or independent algorithm that draws a graph of correlated words e.g. a cluster graph. Once the validation test is passed, a summary of the potential fault can be sent to the vehicle product management team for further analysis. Then, recommendations can be provided to the manufacturers such as e.g. the OEMs.

Exemplary embodiments may provide an analysis to recognize cause-effect and correlation between terms (keywords) and so able to provide better insight on potential fault in vehicle parts. Additionally, thanks to this insight, the methods according to exemplary embodiments may advantageously associate the defect with geo location and/or timing.

In the following, support for features of the claims will be given, and advantages will be described. Further advantages and features may become apparent from the later more detailed description of drawings and exemplary embodiments.

According to an aspect, a method for an automated analysis of social media data, in particular for product failure detection, may be provided, wherein the method may comprise: providing and/or obtaining analysis input data (e.g. social media data, insurance company report data, manufacturer report data and/or On-Board-Diagnosis data, etc.) from one or more data sources (e.g. from social media platforms, insurance companies, car and/or part manufacturers, and/or repair shops etc.), performing data analysis processing of the analysis input data, and outputting analysis result data, in particular analysis result data indicative of a potential product failure detection based on the analysis of the provided/obtained analysis input data.

In some embodiments, the method may comprise pre-processing the obtained analysis input data to generate pre-processed analysis input data available for data analysis processing (which may at least or only may include storing the provided/obtained analysis input data in a data format for input to the data analysis processing, but may also or as alternative include data preparation and data cleansing for performing data analysis in later processes).

In some embodiments, the analysis input data may include a plurality of text documents, e.g. user-created text documents in case of social media data, such as e.g. blog posts or comment documents (sometimes simply referred to as comments) created by users of the one or more social media platforms.

In some exemplary embodiments, the text documents may respectively be associated with at least one of a plurality of data samples, e.g. such as with a plurality of time periods and/or a plurality of geo locations.

For example, in the exemplary case of social media data, the user-created text documents may represent comments created by users of the one or more social media platforms such as, e.g., comments in online blogs, online forum threads, online comment sections of online services, online discussion boards and/or other social media platforms, comment-sections of public wikis and/or complaint online sites, or the like.

Each of the comments (e.g. user-created text documents) may further include or be associated with comment metadata such as comment metadata including information on a time of creation of the comment (e.g. by being associated with or including date information and/or a time stamp), a location of creation of the comment, an identity of the user (not necessarily in the sense of personal identification, but rather information that allows to discriminate between comments created by different users, e.g. based on IP addresses and/or user names such as nicknames used by the user or the like).

In some embodiments, performing data analysis processing of the analysis input data or the pre-processed analysis input data may include a word count processing, a correlation determination processing, a correlation-link identification processing, and/or correlation group identification processing.

Preferably, word count processing may be executed to determine word count numbers indicative of occurrence frequencies (in units of number, or number per unit time, such as e.g. number per unit of a time period) for keywords of a database, which includes a plurality of keywords, in the text documents of the (potentially pre-processed) analysis input data for each of the plurality of data samples (e.g. time periods). In some embodiments, the method may further comprise providing the database indicative of a plurality of keywords. Herein, the term "keyword" may represent a pre-defined string of characters, such as single words, combinations of two or more words, numbers, combinations of numbers and words, or others.

Preferably, correlation determination processing may be executed to determine a respective correlation coefficient associated with a respective keyword pair for each of a plurality of keyword pairs (preferably for all possible combinatory keyword pairings combined from all keywords, or for all possible combinatory keyword pairings combined from all non-omitted keywords). Preferably, the respective correlation coefficient may be indicative of a quantitative measure of correlation (e.g. a statistical correlation) between the determined word count numbers of the keywords of the respective keyword pair for the plurality of data samples (e.g. time periods).

Preferably, correlation-link identification processing may be executed to identify correlation-linked keyword pairs, wherein keywords of a keyword pair are preferably determined to be correlation-linked to each other based on a correlation criteria, the correlation criteria preferably including a criteria whether the determined correlation coefficient associated with the respective keyword pair exceeds a correlation threshold.

Preferably, correlation group identification processing may be executed to identify correlation groups of keywords based on the identified correlation-linked keyword pairs, each correlation group preferably including keywords of at least one correlation-linked keyword pair and, for each keyword included in the respective correlation group, the respective correlation group preferably further includes one or more (or preferably all) other keywords identified to be correlation-linked to the respective keyword.

In some embodiments, the method may further include outputting, if one or more correlation groups of keywords are identified, analysis result data indicative of at least one of the one or more identified correlation groups of keywords.

In the following, preferred aspects and exemplary embodiments are described. Unless explicitly stated that different features or aspect represent pure alternatives that cannot be combined, it is to be understood that the any two or more of the following aspects and features may be combined to form further embodiments, as long as such combinations lie within the scope of the independent claim(s).

In some preferred embodiments, the data processing (such as e.g. the social media analysis processing of the social media data) may further include: omitting keywords, which fail to meet a frequency criteria, prior to the correlation determination processing.

Preferably, the frequency criteria may include a criteria whether the determined word count number for the respective keyword for at least one of the data samples (e.g. time periods) exceeds a frequency threshold. This has the advantage that keywords that have low occurrence frequencies may be omitted in the thereafter following processing to advantageously and significantly reduce processing burden and memory or storage usage.

Preferably, the data analysis processing may further include: adjusting the frequency threshold applied to determine word count numbers for a certain data sample (e.g. time period) based on a total number of text documents being associated with the certain data sample (e.g. time period).

This has the advantage that a frequency threshold may be automatically adapted based on the online discussion traffic of the respective data sample/time period, e.g. such that data samples/time periods with lower online discussion traffic (e.g. in a time periods with a lower total number of user-created text documents) are processed with a lower frequency threshold, and data samples/time periods with higher online discussion traffic (e.g. in a time periods with a higher total number of user-created text documents) are processed with a higher frequency threshold, so that relatively relevant discussion topics of data samples/time periods with lower online discussion traffic are appropriately weighted higher than relatively irrelevant discussion topics of data samples/time periods with higher online discussion traffic.

Preferably, the frequency criteria may include a criteria whether an average word count number for the respective keyword for the plurality of data samples (e.g. time periods) exceeds a frequency threshold.

This has the advantage that even word counts for data samples/time periods with low occurrence frequency for a keyword may be included in the analysis if the average word count for that keyword is higher due to higher word counts in other data samples/time periods. Here, preferably, the data analysis processing may further include: adjusting the frequency threshold applied to determined average word count numbers for the plurality of data samples/time periods based on a total number of text documents of the plurality of data samples/time periods.

In some preferred aspects, the method may include adjusting the frequency threshold based on one or more credibility weighting factors indicative of a credibility level of one or more users as creators of one or more of the text documents and/or of a credibility level of one or more data sources.

In some preferred embodiments, such credibility weighting algorithm could be additionally implemented to consider a credibility or reliability of the documents (text documents or comments). For example, if online forums or discussion boards are used as data source, such data sources may provide a level of credibility or reliability of the particular users (e.g. guest, registered user, expert user, administrator, etc.). Also, if different sources are used, the sources may have different credibility of reliability, e.g. if a general topic online forum is used as a first data source and a specialized expert online forum is used as a second data source.

In such embodiments, for each document such as (text document or comment) a credibility weighting factor may be associated with the respective document depending on a credibility or reliability of the data source providing the document and/or depending on a credibility or reliability of the user who created the document. Then, in the word count processing, the word counts or keyword occurrence frequencies in the word count processing may be weighted or adjusted, for each document and/or for each data source, based on the respective associated weighting factor. In addition, or as an alternative, the applied frequency threshold for the keywords can be adjusted based on the weighting factors associated with documents (and/or their data sources) in which the respective keyword occurs.

In some preferred embodiments, the data analysis processing may further include distance determination processing executed to determine, for each of the plurality of keyword pairs (or for each of the correlation-linked keyword pairs), a respective distance coefficient being associated with the respective keyword pair, the respective distance coefficient preferably being indicative of a relative distance of the keywords of the respective keyword pair in each respective text document of the pre-processed analysis input data. Preferably, the correlation criteria applied in the correlation-link identification processing further includes a criteria whether the determined distance coefficient associated with the respective keyword pair exceeds a distance threshold.

This has the advantage that another validation processing may be added to test the reliability of the correlation link identification processing based on the correlation determination processing using the calculated correlation coefficients. Specifically, the calculated correlation coefficients of the correlation determination processing may indicate a statistical correlation or likelihood thereof for a pair of keywords based on their word count numbers, but the correlation may be due to other factors or accidental, than a correlation that the keywords are used in a same or similar context by individual users.

Preferably, the distance coefficient being associated with the respective keyword pair is determined in a range between a maximum distance coefficient value, which preferably indicates that the keywords of the respective keyword pair occur in a same text documents or even close (or next) to each other in plural text documents, and a minimum distance coefficient value, which preferably indicates that the keywords of the respective keyword pair do not occur together in any of the text documents.

By determining the distance coefficient being indicative of the relative distance of the keywords of the respective keyword pair in each respective text document (e.g. indicating whether the keywords are likely to be used in the same comment/text document, or even whether the keywords are likely to be used in close distance to each other in the same comment/text document), it is advantageously possible to validate the correlation linked keyword pairs based on the respective determined distance coefficient to validate the correlation as a correlation due to the situation that the keywords are (or are not) likely to be used by users in the same comment/text document indicating that the keywords are used by individual users in the same context.

In some preferred embodiments, providing one or more databases comprises providing a first database indicative of a plurality of keywords for the word count processing performed for the correlation determination processing, and/or providing a second database indicative of a plurality of keywords for the word count processing performed for the distance determination processing.

Preferably, the second database includes all keywords included in the first database and additional keywords not included in the first database.

In some preferred embodiments, the method further includes a machine learning process which may comprise: updating the first database (for example, by adding one or more keywords from the second database to the first database, e.g. if the distance determination processing identifies one or more keyword pairs which fulfill the criteria whether the determined distance coefficient associated with the respective keyword pair exceeds a distance threshold and/or which include a respective keyword which is already included in the first database and/or a respective keyword which was previously not included in the first database) and/or repeating the word count processing for the correlation determination processing and/or the correlation determination processing based on the one or more added keywords of the updated first database.

In some preferred embodiments, the database may include a plurality of search terms being surjectively mapped onto the plurality of keywords, preferably such that each search term is mapped to one of the plurality of keywords and/or each keyword is associated with one or more of the plurality of search terms being mapped to the respective keyword. In this context, a surjective mapping means that each search term is mapped to a single keyword, but each keyword may have zero, one or plural search terms being associated with the respective keyword. Herein, the term "search term" may represent a pre-defined string of characters, such as single words, combinations of two or more words, numbers, combinations of numbers and words, or others.

Preferably, the pre-processing to generate the pre-processed analysis input data includes identifying occurrences of search terms in the text documents and replacing the identified search terms by their respective associated keywords based on the database.

This has the advantage that the number of searched keywords can be reduced in the following processing since a higher number of search terms is mapped to a lower number of keywords, so that especially word count processing, correlation determination processing and/or distance determination processing may be performed at lower processing burden and storage or memory usage.

However, this has another significant advantage that statistical correlations due to higher frequency occurrences of keywords can be achieved by mapping plural related search terms to a synonymous or more general summarizing keyword that has an association to the search terms. For example, in the regular usage of words, there may occur situations in which plural search terms represent synonyms to each other, and these may be mapped to one single synonymous keyword to reduce processing burden and increase statistical significance in the later processing to higher number of average word counts for the keyword compared to the single frequency occurrences of the single search terms. Also, for example, users sometimes describe higher or lower degree of details on some topics. If the analysis is not dependent on too high a degree of detail, it is possible to summarize a plurality of more detailed search terms by a single summarizing keyword, also to reduce processing burden and increase statistical significance in the later processing to higher number of average word counts for the keyword compared to the single frequency occurrences of the single search terms.

Preferably, as an alternative example to the above aspect of replacing the identified search terms by their respective associated keywords (or as additional validation calculation), word count processing may include determining word count numbers indicative of occurrence frequencies for search terms of the database in the text documents of the pre-processed social media data for each of the plurality of data samples/time periods, and adding, for each of the plurality of time periods, the determined word count numbers for all search terms mapped to the same keyword to determine the respective word count number for the respective keyword. This still has the advantage that processing burden in the later correlation related processing can be reduced significantly. However, replacing search terms by keywords prior to word count processing is more efficient because the processing burden can be reduced already for the word count processing.

In some preferred embodiments, the pre-processing to generate the pre-processed analysis input data may include a data cleansing process which may comprise: removing redundant text portions from text documents occurring already in another one of the text documents. This has the advantage that processing burden may be reduced, but more importantly has the advantage that the word count processing is made at higher accuracy because redundant occurrences of keywords are avoided to be counted in the word count processing.

In some preferred embodiments, the pre-processing to generate the pre-processed analysis input data may include a data cleansing process which may comprise: converting words of the text documents to one case; removing punctuation characters from the text documents; removing stop words from the text documents; removing irregular characters; correcting typographical errors; and/or removing markup language tags. This has the advantage that processing burden and storage and memory usage may be reduced in the later processing, and additional manual validation of the process may become easier.

In some preferred embodiments, the pre-processing to generate the pre-processed analysis input data may include: searching user-created text documents for common reference phrases which may refer to a text, portion in another user-created text document, and/or replacing identified common reference phrases by the referenced text portion the other user-created text document or at least by one or more search terms or keywords included in the referenced text portion of the other user-created text document. This has the advantage that the quality of the occurrence frequency analysis to reflect the actual contextual occurrence frequency may be improved since common reference phrases agreeing to a text including one or more keywords may be included in the analysis even though the keyword was not explicitly mentioned and would therefore neglect to count the keyword although a user has agreed to it by a common reference phrase.

In some preferred embodiments, the method may further comprise analyzing correlation groups of the analysis result data and adjusting the mapping between search terms and keywords based on machine learning on the basis of the analysis of the analysis result data. For example, if two correlation groups have been found with plural keywords being members of both correlation groups but other keywords only being member of one of the two correlation groups, such keywords may be candidate keywords to be grouped together as search terms which may be designated to be mapped to one common keyword (e.g. to a synonymous or more general summarizing keyword that has an association to the search terms).

In some preferred embodiments, the database is grouped into plural categories, each keyword being associated with one of the plural categories. This has the advantage that the analysis can be performed for plural keywords of plural different content categories so that correlations of different keywords of different content categories may be identified.

This is especially advantageous in case of the aim to detect product failures based on the social media data, because it is possible to detect product failures, e.g. if a keyword of a category of product names or part names is found to be correlated (correlation-linked) to a keyword of a category of keywords indicating product failure or product problems. It may advantageously further provide information on a possible cause or context of the detected product failures, if one or both of the afore-mentioned keywords is/are further correlated (correlation-linked) to a keyword of a cause or context category, and/or if the one or both of the afore-mentioned keywords is/are further correlated to a keyword of a category of environmental conditions such as usage conditions, weather conditions, location or climate conditions etc.

Specifically, it may be preferable that a correlation group of correlation-linked keywords is analyzed as to whether the keywords of the correlation group may be used to form a "correlation sentence" in the sense that the correlation group at least includes a keyword for each of a plurality of sentence-relevant categories. For example, a "correlation sentence" may be formed, in some embodiments, for detecting product failure, if the identified correlation group at least includes a keyword of a category of product names or part names that is found to be correlated (correlation-linked) to a keyword of a category of keywords indicating product failure or product problems.

Preferably, the method may comprise identifying one or more correlation groups of keywords which contain at least one keyword being associated with each or at least a pre-determined number of categories of a pre-determined set of two of more categories of the database. This has the advantage that a sentence criteria may be implemented. It is possible to provide the sentence criteria to be applied to a correlation group indicating that the correlation group allows to extract a correlation sentence if the correlation group includes at least one keyword for each of a plurality of pre-defined sentence-relevant categories. The set of sentence-relevant categories may represent all available categories of the database or a subset of at least two of the available categories of the database.

Preferably, the categories (or the sentence-relevant categories) may include one or more of: a manufacturer category including keywords associated with manufacturer's names, in particular names of automotive manufacturers; a product category including keywords associated with products or product models, in particular automobile models; a part category including keywords associated with parts of products or product models, in particular automobile parts; a malfunction category including keywords associated with product malfunction or failures; a category including keywords associated with problems being resolved and/or normal functioning of a product or product part; a weather category including keywords associated with weather attributes; a location category including keywords associated with locations, in particular regions, countries, states, and/or cities; a road type category including keywords associated with road types and/or road conditions; a driving maneuver action category including keywords associated with driving maneuver actions performed by a vehicle and/or by a driver of the vehicle; and/or a problem-solution-feedback category including keywords associated with one or more solutions to one or more problems (such as e.g. comments "in case of this problem, please refer to the manual" or "in case of problem . . . , do . . . " etc.).

For example, if a correlation group of correlation-linked keywords includes at least one correlation-linked keyword for each of the categories: at least one keyword from the product category and/or at least one keyword from the part category, at least one keyword from the manufacturer category and at least one keyword from the malfunction category, it is possible to extract a correlation sentence of the respective keywords indicating that a certain product and/or part of the product of a certain manufacturer may have been detected to have a failure problem, so that the failure detection may be achieved based on the social media data. Other additional correlation-linked keywords from other categories may include additional contextual information added to the detected correlation sentence or the detected product failure. This may be analyzed further by extracting the related comments/user-created text documents to analyze the detected problem.

If the problem is validated or already based on the identified correlation group, this may allow to initiate a recall operation much earlier and at much lower costs than in past situations without social media analysis.

In some preferred embodiments, the method may further comprise adjusting the correlation criteria based on one or more of the criteria: if no correlation-linked keyword pair is identified in the correlation-link identification processing; if no correlation group is identified in the correlation group identification processing; if the maximum number of keywords occurring in the identified correlation groups is lower than a pre-set threshold; and/or if the average number of keywords in the identified correlation groups is lower than a pre-set threshold.

This has the advantage that the process may be repeated for adjusted criteria settings to either increase the identified number of correlation groups (e.g. if no correlation group or only low number of correlation groups is identified), or to increase or decrease the number of keywords in one or more correlation groups (e.g. if a correlation group includes too many keywords e.g. from same categories, or if a correlation group includes too less keywords to make sense out of the potential detected context of the keyword correlation, e.g. if the above sentence criteria is not met). Preferably, the method may, then further comprise repeating the correlation-link identification processing and the correlation group identification processing based on the adjusted correlation criteria.

Preferably, the method may further comprise adjusting the correlation criteria if no correlation group, which contains at least one keyword being associated with each of a pre-determined set of two of more categories of the database (e.g. according to the above sentence criteria), is identified; and/or repeating the correlation-link identification processing and the correlation group identification processing based on the adjusted correlation criteria. This has the advantage that the process may be repeated for adjusted criteria settings to increase or decrease the number of keywords in one or more correlation groups (e.g. if a correlation group includes too many keywords e.g. from same categories, or if a correlation group includes too less keywords to make sense out of the potential detected context of the keyword correlation, e.g. if the above sentence criteria is not met).

Preferably, adjusting the correlation criteria may include adjusting the correlation threshold, a frequency threshold, and/or a distance threshold. Also this has the advantage that processing burden can be adjusted by reducing the number of processed items per processing, and results of the analysis can be improved automatically, by adjusting the correlation threshold, the frequency threshold, and/or the distance threshold, or the sentence, criteria, if no or too many correlation groups are identified, and/or if identified correlation groups include too many or too less number of keywords, or too less categories involved in the correlation groups. Then, the process may be repeated based on the adjusted criteria.

In the above, word count processing is used in connection with data processing of analysis data, and keywords and/or search terms are counted to determine a word count number or word occurrence frequency, and in some embodiments also to determine an adjusted frequency threshold based on a total number of word counts or the like.

In some preferred embodiments, another weighting algorithm could be additionally implemented to consider a credibility or reliability of the documents (text documents or comments). For example, if online forums or discussion boards are used as data source, such data sources may provide a level of credibility or reliability of the particular users (e.g. guest, registered user, expert user, administrator, etc.). Also, if different sources are used, the sources may have different credibility of reliability, e.g. if a general topic online forum is used as a first data source and a specialized expert online forum is used as a second data source.

In such embodiments, for each document such as (text document or comment) a credibility weighting factor may be associated with the respective document depending on a credibility or reliability of the data source providing the document and/or depending on a credibility or reliability of the user who created the document. Then, in the word count processing, the word counts or keyword occurrence frequencies in the word count processing may be weighted or adjusted, for each document and/or for each data source, based on the respective associated weighting factor. In addition, or as an alternative, the applied frequency threshold for the keywords can be adjusted based on the weighting factors associated with documents (and/or their data sources) in which the respective keyword occurs.

According to another aspect, there may be provided a computer program product including computer program instructions stored on a computer-readable medium which, when executed on a computer or computer system, are configured to execute, on the computer or computer system, the steps of a method of any of the above aspects and embodiments, or combinations thereof.

According to another aspect, there may be provided an apparatus for executing an automated data analysis. The apparatus may comprise: a storage, a data input interface, a processing system, and/or a data output interface. The storage may be configured to store a database indicative of a plurality of keywords.

The data input interface may be configured to obtain social media data and/or other types of analysis input data as discussed above from one or more data sources such as social media platforms providing social media data including a plurality of user-created text documents respectively being associated with at least one of the plurality of data samples/time periods, and/or other data sources such as report data from insurance companies, repair shops, car and/or part manufacturers, etc., including a plurality of text documents respectively being associated with at least one of the plurality of data samples/time periods.

The processing system may be configured to execute pre-processing the obtained social media data and/or or other analysis input data to generate pre-processed analysis input data available for data analysis processing and/or the processing system being configured to execute the data analysis processing, for example, according to one or more of the above aspects and embodiments, or combinations thereof.

The data output interface may be configured to output, if one or more correlation groups of keywords are identified, analysis result data indicative of at least one of the one or more identified correlation groups of keywords.

BRIEF DESCRIPTION OF DRAWINGS

FIG. 2B exemplarily illustrates a flow chart of another method for performing data analysis processing (such as e.g. in step S4 in FIG. 1) in an automated analysis of analysis input data according to some exemplary embodiments.

FIGS. 4A to 4E exemplarily illustrate flow charts of exemplary methods for performing data analysis processing according to some further embodiments.

DETAILED DESCRIPTION OF DRAWINGS AND OF PREFERRED EMBODIMENTS

Figure 1:
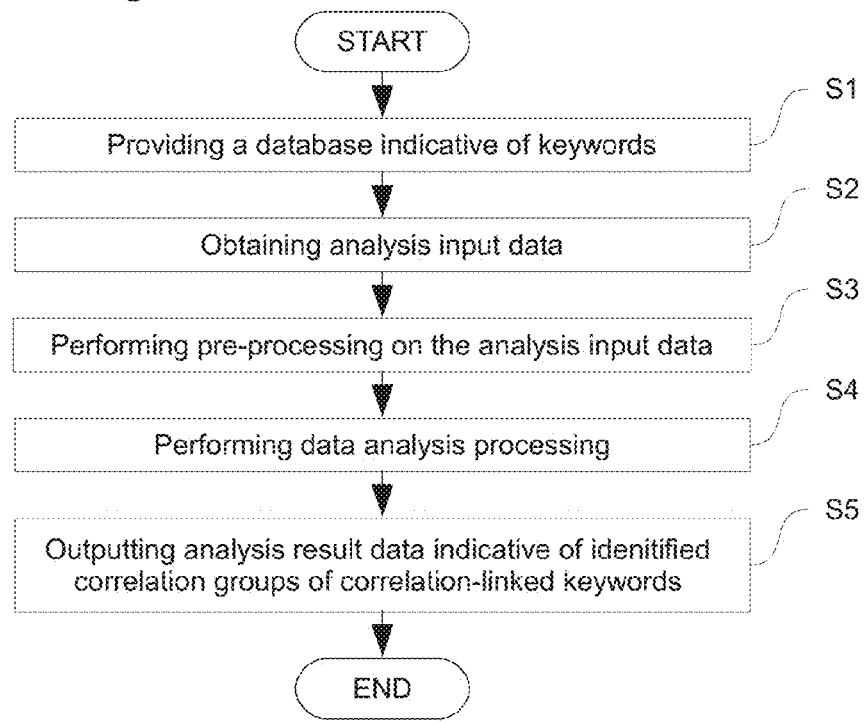
FIG. 1 exemplarily illustrates a flow chart of a method for an automated analysis of analysis input data according to some exemplary embodiments.

In the following, preferred aspects and exemplary embodiments will be described in more detail with reference to the accompanying figures. Same or similar features in different drawings and embodiments are sometimes referred to by similar reference numerals. It is to be understood that the detailed description below relating to various preferred aspects and preferred embodiments are not to be meant as limiting the scope of the present invention.

In the most preferable aspects, the embodiments shall be applied to the automotive industry, and in particular to failure detection based on social media analysis for early detection of recall situations to avoid high costs. However, it is to be noted that the aspects and embodiments may also be applied to different fields. Exemplarily, the embodiments will be described in the context of analyzing social media data as analysis input data.

However, the present invention and exemplary embodiments thereof are not in any way limited to the analysis of social media data, but other data can be used as analysis input data (as long as it can be divided into plural text documents that can be associated with one or more data samples). For example, in the automotive field, the analysis input data may (in addition to or instead of social media data) include On-Board-Diagnosis data (such as OBD or OBD2) and/or repair report data obtained from vehicles by repair shops and garages, to be collected for the data analysis. Such data may be indicative of error codes (e.g. strings of one or more numbers and/or one or more letters) obtained from/for vehicles. For example, On-Board-Diagnosis data may be data obtained via vehicle diagnostic interfaces via which error codes can be collected (each text document e.g. relating to a diagnostic analysis of a certain vehicle). Typically, repair shops such data from vehicles during diagnostic work and maintenance work.

In addition, or alternatively, the analysis input data may relate to documentation data obtained from car manufacturers and/or OEMs (Original Equipment Manufacturer).

Also, again in addition or alternatively, the analysis input data may relate to data obtained from car insurance companies, each text document relating to report data of a car insurance event.

In general terms, analysis input data may be text and string code data that includes text documents to be associated with one or more data samples.

In the below examples and exemplary embodiments, it is exemplarily assumed further that the data samples refer to time periods, however, the present invention is not limited to time periods as reference for the data samples, and the data samples may additionally or alternatively refer to geo locations, each data sample relating e.g. to another time period and/or another geo location.

According to some preferred exemplary aspects, it is possible to propose a process or sub-processes to collect, process, analyse and/or validate information from relevant social media and/or the other above mentioned data sources, and to derive insights about a given product defect as soon as the user starts talking about it. As the data comes in, it is analysed and information (like auto part defect/failure, level of severity of defects) can be extracted, e.g., using specialised automobile dictionaries which may additionally be trained using machine learning in some embodiments.

Further, in some exemplary embodiments, with a pre-defined correlation threshold, multiple correlations can be identified and be performed to match the detected failed parts with the causes and the geo location where it occurred e.g. based on keywords of different categories. The correlation(s) can be validated in some exemplary embodiments, using a parallel or independent algorithm that draws a graph of correlated words e.g. a cluster graph. Once the validation test is passed, a summary of the potential fault can be sent to the vehicle product management team for further analysis. Then, recommendations can be provided to the manufacturers such as e.g. the OEMs.

Exemplary embodiments may provide an analysis to recognize cause-effect and correlation between terms (keywords) and so able to provide better insight on potential fault in vehicle parts. Additionally, thanks to this insight, the methods may advantageously associate the defect with geo location and/or timing.

In some aspects, the analysis input data may be captured from relevant sources, cleansed and extracted. The extracted data can then be analyzed to derive insights e.g. of vehicle defects. The derived insights can then be validated, and the results can be presented to analytic teams and/or vehicle product managers who recommend actionable insights to the OEMs. The following are the steps may generally be involved in the analytic process: providing (e.g. selecting) data sources; data capturing, cleansing and extraction to provide extracted data; data analytics and insights; validation; and/or actionable insights and recommendation.

Regarding data sources: data sources, used in the algorithm of one or more of the below embodiments may be data sources such as social media platforms. When the embodiments are applied to the automotive field, in particular to detect part failures in the automotive field, relevant data sources may include automobile discussion forums, open online communities (e.g. social networks), complaint sites and public wikis. To mention few, websites like http://www.carcomplaints.com/, http://www.safercar.gov/, http://www.audiworld.com/, https://www.facebook.com/BMW, http://honda-tech.com/. Data from other sources e.g. spare parts, repair shops, weather information, police and insurance companies, road side infrastructures might be used to further validate the derived insights.

When applying the embodiment(s) to the automotive field, a database as discussed below preferably includes a library of predefined automobile dictionaries of words. These dictionaries may include, but not limited to, the following categories:

list of auto models
list of auto parts
Weather attributes (e.g., rain, fog, winter, cold hot, etc.).
  Note: this is better represented with regular expressions to extract weather related information
Full list of countries/States
List of geo-Location/Cities
Attributes associated to failure (e.g., bad, issues, failure, failed, stopped working, stalled, broken, shattered, etc.)
Attributes associated to "working fine"
Attributes associated to "issues resolved"
Attributes associated with agreement with an earlier comment like "I agree with X" or "I have the same problem (as Y)"

In more general terms, the database may grouped into plural categories, each keyword being associated with one of the plural categories; the categories including one or more of: a manufacturer category including keywords associated with manufacturer's names, in particular names of automotive manufacturers; a product category including keywords associated with products or product models, in particular automobile models; a part category including keywords associated with parts of products or product models, in particular automobile parts; a malfunction category including keywords associated with product malfunction or failures; a category including keywords associated with problems being resolved and/or normal functioning of a product or product part; a weather category including keywords associated with weather attributes; and/or a location category including keywords associated with locations, in particular regions, countries, states, and/or cities. Also, the categories may include a road type category indicative of a plurality of keywords associated with road types (such as multi-lane speedway or highway, cross-country road, city highway, city street, dirt road etc.) and/or road conditions (e.g. icy street, wet street, dusty street, etc.). Also, the categories may include a driving maneuver action category including a plurality of keywords associated with driving maneuver actions such as e.g. braking maneuver, acceleration maneuver, steering maneuver, etc.

When extracting comments (user-created text documents) from the obtained social media, in some exemplary embodiments, the comments may be extracted in a way that each comment is time, date and/or location stamped to show when the data was generated and/or at which part the world the data is concerned. Similarly, text documents obtained from reports of repair shops (e.g. based on On-Board-Diagnosis data) or manufacturer and/or insurance company reports may be time, date and/or location stamped.

FIG. 1 exemplarily illustrates a method for an automated analysis of analysis input data (here exemplarily social media data) according to some exemplary embodiments.

The exemplary process of FIG. 1 includes a step S1 of providing a database which is indicative of a plurality of keywords. Herein, the term "keyword" may represent a pre-defined string of characters, such as single words, combinations of two or more words, numbers, combinations of numbers and words, or others. This may be relating to a dictionary database including plural keywords related to one or more specified topics such as topics of interest for the social media data analysis and/or to a plurality of categories.

The exemplary process of FIG. 1 further exemplarily includes a step S2 of obtaining social media data (analysis input data). In some embodiments, the obtained social media data (analysis input data) may be retrieved from one or more social media platforms (data sources). Steps S1 and S2 may be performed in any order or in parallel to each other. In some embodiments, the social media data (analysis input data) may include a plurality of text documents (e.g. user-created text documents), such as e.g. comment documents (sometimes simply referred to as comments) created by users of the one or more social media platforms, the user-created text documents respectively being associated with at least one of a plurality of time periods.

For example, the user-created text documents may represent comments created by users of the one or more social media platforms such as, e.g., comments in online blogs, online forum threads, online comment sections of online services, online discussion boards and/or other social media platforms, comment-sections of public wikis and/or complaint online sites, or the like.

Each of the comments (user-created text documents) may further include or be associated with comment metadata such as comment metadata including information on a time of creation of the comment (e.g. by being associated with or including date information and/or a time stamp), a location of creation of the comment, an identity of the user (not necessarily in the sense of personal identification, but rather information that allows to discriminate between comments created by different users, e.g. based on IP addresses and/or user names such as nicknames used by the user or the like).

Regarding the "plurality of time periods", it is noted that the term identifies at least two time periods (data samples). The time periods may be of same size of duration (e.g. associated with units of days, weeks, months, or the like) or of different size of duration. The time periods may be overlapping in time or be disjoint. For the purpose of social media analysis, it is preferred that each user-created text document is associated with at least one of the time periods, e.g., based on the date and/or time of creation by the user. As previously mentioned, the data samples may also relate to geo-locations instead or in addition to time periods.

In some embodiments, each comment (user-created text document) may be associated with only one time period (and/or geo-location), e.g. in case of disjoint time periods, and, in some other embodiments, the comments (user-created text documents) may be associated with one or more time periods, e.g. in case of overlapping time periods.

In preferred embodiments, the time periods may be disjoint and of same size of duration, e.g. different days, different months, or different successive time periods of a pre-determined size. In other embodiments, it may be possible to provide cumulative time periods such that each time period includes the previous time period plus an additional subsequent time period, e.g. the first time period includes a first day (or month or other unit of a time period) of data obtaining/data capturing, a second time period includes a first and a second day (or month or other unit of a time period), a third time period includes first to third days (or month or other units of a time period), a fourth time period includes first to fourth days (or month or other units of a time period), etc.

The exemplary process of FIG. 1 further exemplarily includes a step S3 of pre-processing the obtained social media data to generate pre-processed social media data (pre-processed analysis input data) available for social media analysis processing (data analysis processing).

In some embodiments, the pre-processing may include preparatory processes to be applied to the obtained social media data (analysis input data) so that it may be input to the below-described analysis process. For example, the pre-processing might include storing the obtained social media data (analysis input data) in a data format for input to the social media analysis processing.

In addition, the pre-processing may also include preparations, data cleansing and data simplification techniques to modify the data to reduce the complexity of the analysis, to reduce the data size and/or to reduce the processing burden in the analysis of the pre-processed data.

For example, since word count determination processing may be performed to count number of occurrences of keywords in some embodiments, the pre-processing may include data cleansing techniques to reduce the data size and the overall word count size in the data, and to reduce metadata portions of the data other than text portions to be analyzed in the word count processing.

For example, the pre-processing may include the pre-processing to generate the pre-processed social media data includes a data cleansing process comprising one or more of the following sub-processes: removing redundant text portions from user-created text documents occurring already in another one of the user-created text documents, converting words of the user-created text documents to one case, removing punctuation characters from the user-created text documents, removing stop words from the user-created text documents (stop words being e.g. words such as "such", "and", "or", "is", "the", "are", "her", "which", "on" etc.; see e.g. https://en.wikipedia.org/wiki/Stop_words), removing irregular characters, correcting typographical errors, and/or removing markup language tags Regarding the potential process of removing redundant text portions from user-created text documents occurring already in another one of the user-created text documents, such aspect may be preferable when analyzing user-created comment documents of an online forum thread including a sequence of plural comment documents of various users.

For example, it may occur that users make reference to a comment of another user by identically copying passages of the referenced earlier comments in their later comments as a sort of quote, citation or reference. Then, in order to avoid over-counting of words due to such redundant repetitions of comment text portions, it is preferred that such redundant portions be identified in pre-processing and be removed.

In this preferred step, redundant comments are checked and deleted, this is to ensure that comments are originated from different statement sources (e.g. by different people).

Regarding the removal of stop words, it may define a plurality of stop words, e.g. by another database of stop words to be removed in pre-processing, or the user may be enabled to pre-define or modify a stored list or group of removable stop words prior to pre-processing. Also, common algorithms of stop word removal may be used.

The pre-processing to generate the pre-processed social media data may also (or alternatively) include a process of searching the user-created text documents/comments of the obtained social media data for common reference phrases, which refer to a text portion in another user-created text document/comment, and replacing identified common reference phrases by the referenced text portion the other user-created text document or at least by one or more search terms or keywords included in the referenced text portion of the other user-created text document.

For example, a database may be provided having a plurality of "common reference phrases" such as "I have the same problem", "I agree", "I heard about this issue" etc. If a user-created document/comment includes such common reference phrase to reference a text portion of a user-created document/comment of another user, the referenced text portion (or at least the identified keywords of the portion) may be included in the user-created document/comment to be replaced for the common reference phrase. This has the advantage that the keywords hidden behind such common reference phrases can be still included to be considered in the later word count processing.

For example, some common and useful phrases in social media can be extracted and replaced with a (common) term or phrase. For example, suppose someone is referring to a problem of a fuel leakage that is being discussed in a forum by writing "I have the same problem", this will be identified and be replaced with the phrase "fuel leakage" or with two separate terms "fuel" and "leakage". Sentiment analysis can also be performed here and detected sentiments can be replaced accordingly with terms and phrases.

The exemplary process of FIG. 1 further exemplarily includes a step S4 of performing social media data analysis processing (data analysis processing) which processes the pre-processed social media data to perform the social media data analysis on the basis of the keywords of the database provided in step S1.

Specifically, based on word counts of keywords in the pre-processed social media data, in particular in the user-created text documents of the social media data, i.e. on the basis of occurrence frequencies of keywords in the pre-processed social media data, the social media data analysis processing is performed to identify and output correlation groups of correlation-linked keywords.

For example, based on word counts of keywords in the pre-processed social media data for plural keywords and plural time periods, it may be determined whether keywords are pairwise correlated (correlation-linked) based on their respective occurrence frequencies/word counts of plural time periods.

Upon identification of one or more correlation groups of correlation-linked keywords in the social media data analysis processing (data analysis processing) of step S4, the analysis result data is generated to be indicative of the identified correlation groups and their associated keywords.

Accordingly, the exemplary process of FIG. 1 further exemplarily includes a step S5 of outputting analysis result data indicative of identified correlation groups of correlation-linked keywords.

Here, the analysis result data may be output in a data format that can be output to the user, e.g. as tables, lists, other written information, and/or in visual graphs such as cluster graphics, e.g. on a screen of a computer or the like.

Figure 2A:
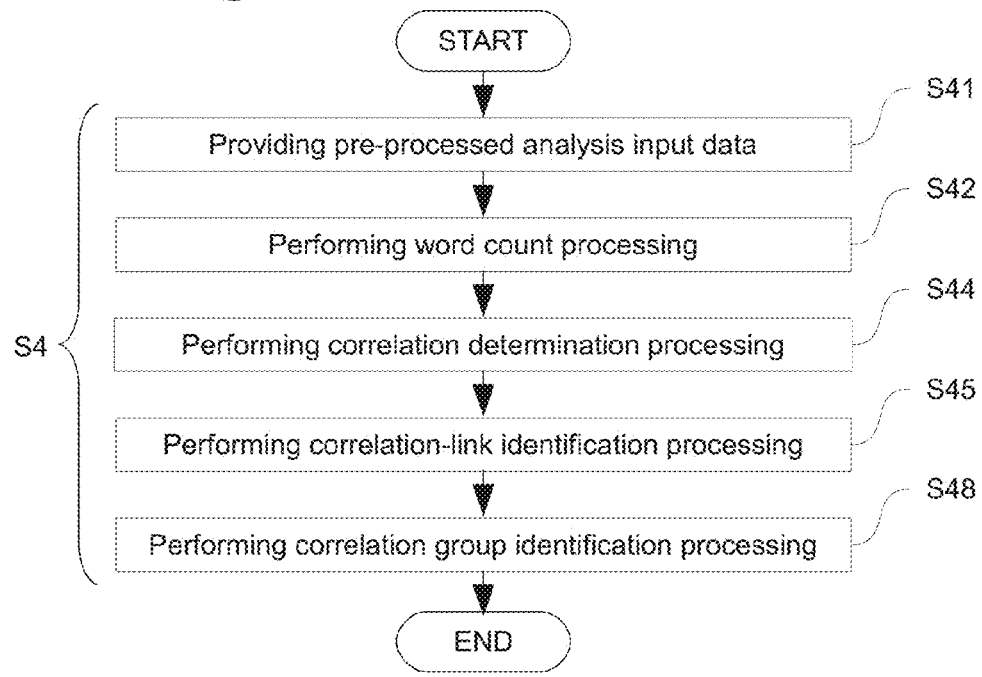
FIG. 2A exemplarily illustrates a flow chart of a method for performing data analysis processing (such as e.g. in step S4 in FIG. 1) in an automated analysis of analysis input data according to some exemplary embodiments.

FIG. 2A exemplarily illustrates a method for performing social media data processing (such as e.g. in step S4 in FIG. 1) automated analysis of social media data according to some exemplary embodiments.

The exemplary process of FIG. 2A exemplarily includes a step S41 of providing pre-processed analysis input data such as e.g. the social media data (e.g. as generated or pre-processed in step S3 of the exemplary method of FIG. 1, and, based on the pre-processed social media data (pre-processed analysis input data), the exemplary process performs a step S42 of word count processing to count number of occurrences of keywords in the pre-processed social media data, in particular in the text documents of the pre-processed social media data (pre-processed analysis input data).

Specifically, the word count processing may be performed to determine word count numbers indicative of occurrence frequencies for keywords of the database in the text documents of the pre-processed social media data (pre-processed analysis input data) for each of the plurality of time periods (data samples).

That is, in some embodiments, the process of step S42 may count, for each of a plurality of (or preferably all) keywords of the keywords of the database, the number of occurrence thereof (occurrence frequency) for each of the plural time periods in the social media data. In the following, it is exemplarily assumed that all keywords of the database are searched, but this is no limitation to the present disclosure as the searchable keywords might also be pre-selected by a user or by other automated processes based on pre-determined input settings selected by the user based on the database.

As an example, if the time periods are exemplarily determined to be units of days, the social media data is grouped per day, and the word counts of the keywords in the social media data is counted for each time period, i.e. for each day, for which social media data has been obtained. This is, however, no limitation, and the time periods may also have other units such as weeks, months or other time periods. They may also be of variable or different duration sizes and be disjoint or overlap with each other.

After word count processing, a word count number (occurrence frequency) is determined for each of the searched keywords and for each of the time periods (data samples). For example, before pre-processing, in the pre-processing stage or after the pre-processing of the analysis input data, the text documents (e.g. user-created text documents such as e.g. user comments) associated with a first day (first time period/first data sample) may be merged into a first data portion to be analyzed (e.g. a first file, first group of files or first portion of one or more files) and the text documents (e.g. user-created text documents such as e.g. user comments) associated with a second day (second time period/second data sample) may be merged into a second data portion to be analyzed (e.g. a second file, second group of files or second portion of one or more files), etc.

The word count processing may determine, for each searched keyword of the database, the word count (occurrence frequency) of the respective keyword in the first data portion to be analyzed as a first occurrence frequency of the respective frequency associated with the first day (e.g. hits per day, or occurrences per day) and the word count (occurrence frequency) of the respective keyword in the second data portion to be analyzed as a second occurrence frequency of the respective frequency associated with the second day (e.g. hits per day, or occurrences per day), etc.

Here, some keywords may have very low word count numbers or word count numbers being zero in one or more of the time periods. In order to reduce processing burden, the method may in some embodiments omit keywords having low occurrence frequencies or zero word count. Some aspects of such embodiments are discussed further below. In simplest versions of such exemplary aspects, the method may simply omit keywords which have a word count of zero at least for a pre-determined number of time periods (e.g. one or more time periods).

In view of the above, it preferred that a respective set of word counts/occurrence frequencies (for each of the plurality of time periods) is determined for each of the searched keywords as an output of the word count processing of step S42.

The exemplary process of FIG. 2A exemplarily further includes a step S44 of performing correlation determination processing. In some exemplary embodiments, the correlation determination processing may be performed to determine, for each of a plurality of keyword pairs, a respective correlation coefficient being associated with the respective keyword pair.

In some embodiments, the step S44 may determine respective correlation coefficients for each of a plurality of keyword pairs that can be formed from providing each of the combinatory combination pairings of all keywords searched in step S42, or, in other embodiments, the step S44 may determine respective correlation coefficients for each of a plurality of keyword pairs that can be formed from providing each of the combinatory combination pairings of the keywords searched in step S42 which passed a frequency test, i.e. that they have not been omitted due to having low occurrence frequencies or zero word count.

For example, if the number of searched keywords in step S44 (or the number of non-omitted keywords after word count processing) is N, the number of all combinatory combination pairings of the keywords (i.e. the number of keyword pairs) would be $N(N-1)/2$, and the step S44 would calculate a respective correlation coefficient for each of the $N(N-1)/2$ keyword pairs, i.e. $N(N-1)$ correlation coefficients.

Here, it can be seen that omitting keywords with low or zero word count after step S42 may be very beneficial for reducing processing burden and increase storage efficiency since processing burden and storage usage increases linear with the number of possible keyword pairs but the number of possible keyword pairs increases quadratically with the number of keywords N.

As a result of the processing of step S44, the method outputs a plurality of keyword pairs and associated correlation coefficients, wherein, for each of the keyword pairs, the respective correlation coefficient is indicative of a quantitative measure of correlation between the determined word count numbers of the keywords of the respective keyword pair for the plurality of time periods, i.e. to indicate if or to what degree the development of word count numbers for the one keyword of the pair over the plural time periods is correlated with the development of word count numbers for the other keyword of the pair over the plural time periods.

In the above, it is possible to use one or more of the parameter correlation determination methods known from statistical mathematics, such as e.g. based on Pearson product-moment correlation coefficient, and/or e.g. rank correlation coefficient calculation methods such as based on e.g. Spearman's rank correlation coefficient.

Usually, parameter correlation determining methods calculate correlation coefficients in the range of the interval between zero and one, wherein a correlation coefficient of zero indicates absolutely no correlation (or no likelihood of correlation) between the samples of the pair of variables (here word counts per time period for the two keywords of a keyword pair) and a correlation coefficient of one indicates a full correlation (or maximum likelihood of full correlation) between the samples of the pair of variables (here word counts per time period for the two keywords of a keyword pair).

The exemplary process of FIG. 2A exemplarily further includes a step S45 of performing correlation-link identification processing to identify correlation-linked keyword pairs, wherein keywords of a keyword pair are determined to be correlation-linked to each other based on a correlation criteria including a criteria whether the determined correlation coefficient associated with the respective keyword pair exceeds a correlation threshold.

Accordingly, the process of step S45 may go through all keyword pairs output from the correlation determination process of step S44 and compare the respective correlation coefficient calculated for that respective keyword pair in the correlation determination process of step S44 with a correlation threshold. If the determined correlation coefficient calculated for that respective keyword pair exceeds the correlation threshold, the keywords of that respective keyword pair are determined (identified) to be correlation-linked as the exceeding of the correlation threshold by their respective associated correlation coefficient indicates a sufficient likelihood of correlation for the keywords of that respective keyword pair.

As a result of the processing of step S45, the method exemplarily outputs a plurality of keyword pairs of correlation-linked keywords, or it may output all keywords which are included at least once in one of the correlation-linked keyword pairs.

Here, it is to be noted that a keyword that is correlated to another keyword may additionally be correlated to one or more other keywords as well, which may or may not be correlated to each other. For example, if a first keyword is correlation-linked to a second and a third keyword, the second and third keywords can be correlation-linked with each other, or the second and third keywords can be not correlation-linked with each other. Of course, the second and/or third keywords may additionally be correlation-linked to one or more other keywords which may or may not be correlation-linked to the first keyword. So, simple or also complex structures of keyword correlation groups (keyword clusters, or keyword clouds) of pairwise correlation-linked keywords may be identified.

Such keyword correlation groups of pairwise correlation-linked keywords are herein referred to, exemplarily, as "correlation groups". In accordance with the above, the minimum content of a correlation group is a pair of keywords of a correlation-linked keyword pair identified in step S45. Also, the maximum number of identifiable correlation groups is equal to the number of correlation-linked keyword pairs identified in step S45. However, in most practical situations it may be expected that the number of identifiable correlation groups lies in between zero and the maximum number of identifiable correlation groups.

The exemplary process of FIG. 2A exemplarily further includes a step S48 of performing a correlation group identification processing to identify correlation groups of keywords based on the identified correlation-linked keyword pairs as determined in step S45.

Exemplarily, each correlation group includes keywords of at least one correlation-linked keyword pair (i.e. the minimum content of a correlation group) and, for each keyword included in the respective correlation group, the respective correlation group further may include the other keywords identified to be correlation-linked to the respective keyword.

Here, a correlation group may be defined in a closed manner, i.e. a correlation group includes all directly and indirectly correlation-linked keywords and, if there are two correlation groups, no keyword or the one group is correlation-linked with the other correlation group. That is, according to such definitions, each keyword that would be correlation-linked at least to one other keyword of the correlation group also belongs to the correlation group (as do all other keywords correlated to that keyword).

In other embodiments, it is possible to define a minimum number of correlation links for each keyword in the correlation-group so that only keywords that are correlation-linked at least to a pre-defined number of other keywords of the correlation group according to the minimum number of correlation links would be considered as being a correlation group member. Then, it might occur that a keyword of one correlation group may be correlation-linked to another keyword of another correlation group. In another sense or in other words, one could say that one first degree correlation group in the sense of the above has subgroups of higher degree, the higher degree being defined by the pre-defined minimum number of correlation links.

Figure 3A:
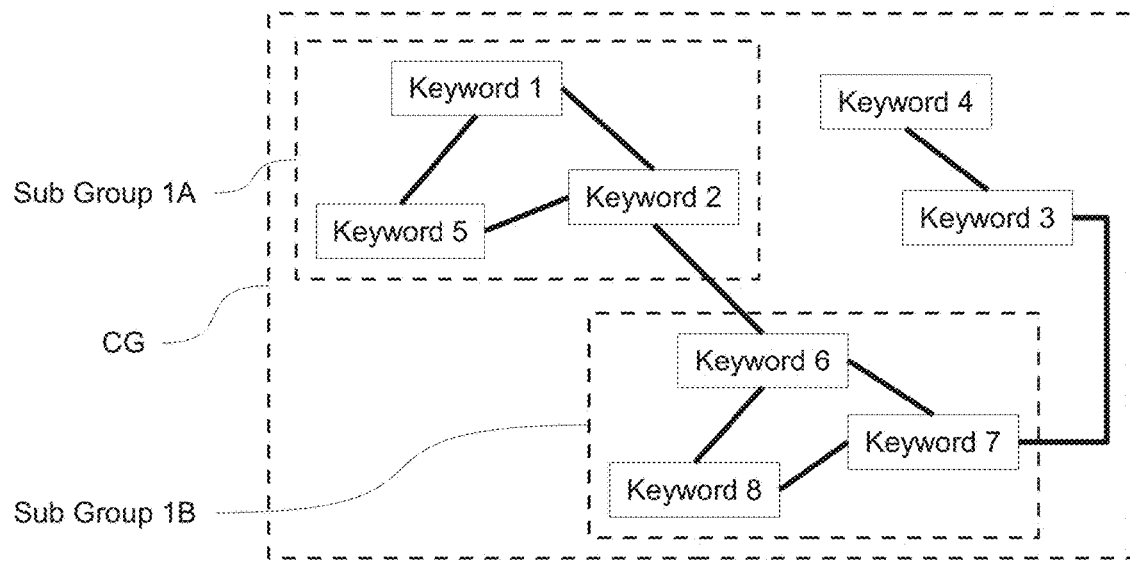
FIG. 3A exemplarily shows a plurality of keywords included in a correlation group (or different correlation groups of higher order) according to an example of a cluster graph.

As an example, FIG. 3A exemplarily shows a plurality of keywords ("Keyword 1" to "Keyword 8") and the lines between two keywords indicate that the respective keyword pair is correlation-linked to each other.

Exemplarily, in FIG. 3, "Keyword 1" is correlation-linked to "Keyword 2" and to "Keyword 5", which are naturally correlation-linked also with "Keyword 1", but are further exemplarily correlation-linked with each other. On the other hand, while "Keyword 3" and "Keyword 4" are correlation-linked to each other, only "Keyword 3" is further correlation-linked to "Keyword 7" while "Keyword 4" is not correlation-linked to any other keyword. Further exemplarily, "Keyword 7" is further correlation-linked to "Keyword 6" and to "Keyword 8", which are naturally correlation-linked also with "Keyword 7", but are further exemplarily correlation-linked with each other.

In the above exemplary definition of the closed correlation group, the FIG. 3 exemplarily shows a correlation group CG which includes all of the keywords "Keyword 1" to "Keyword 8" because each of these keywords is correlation-linked at least to one other of the keywords of the correlation group CG and all keywords correlation-linked at least to one other of the keywords of the correlation group CG are included in the correlation group CG.

On the other hand, if one would use a definition that a minimum number of correlation-links is two, the correlation group CG (of first degree) would be split into two subgroups (of second degree), i.e. the subgroups 1A and 1B in FIG. 3, since each keyword of the respective (sub)group is correlation linked to at least two other keywords of the respective correlation (sub)group and all keywords which are correlation-linked to at least two other keywords of the respective correlation (sub)group are included in the respective correlation (sub)group. However, "Keyword 3" and "Keyword 4" would not be included in any of the correlation (sub)groups of second degree.

Figure 3B:
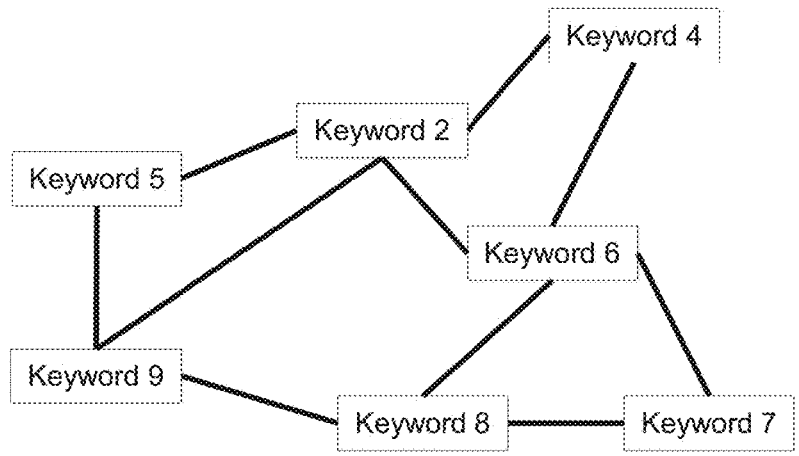
FIG. 3B exemplarily shows another cluster graph upon including data from one or more further data samples.

FIG. 3B exemplarily shows another cluster graph upon including data from one or more further data samples, such as e.g. data of one or more time periods. Such adding of additional data may change the results based on the new calculation of correlation links.

In FIG. 3B, exemplarily the correlation-links to Keyword 1 and Keyword 3 disappeared in the correlation group, while new correlation-links appeared between Keyword 2 and Keyword 4 and between Keyword 4 and Keyword 6. Further exemplarily, a new Keyword 8 appeared in the correlation group with new correlation-links to Keyword 5, Keyword 2 and Keyword 8.

Of course, such changes are purely exemplarily, but are intended to show that new correlation-links to previous or new keywords may appear due to new or additional data samples and/or previous correlation-links and/or related keywords may disappear in the results of the analysis based on new or additional data with further data samples, e.g. such as in connection with data on one or more further time periods.

FIG. 2B exemplarily illustrates another method for performing social media data processing (such as e.g. in step S4 in FIG. 1) automated analysis of social media data according to some other exemplary embodiments.

Exemplarily, the process of FIG. 2B also includes steps, S41 of providing the pre-processed social media data (pre-processed analysis input data), S42 of performing word count processing, S44 of performing correlation determination processing, S45 of performing correlation-link identification processing, and S48 of performing correlation group identification processing.

Exemplarily, the process of FIG. 2B further includes another step S43 of performing a frequency test to extract frequent keywords after performing the word count processing of step S42. Such step S43 could also be included between steps S42 and S44 in the method of FIG. 2A above.

For step S43, there may be pre-defined a frequency threshold, and the process of step S43 may include omitting keywords for which a word count has been determined in step S42 but which fail to meet a frequency criteria, prior to the correlation determination processing. The frequency criteria may include a criteria whether the determined word count number for the respective keyword for a pre-determined number of the time periods (e.g. for all, some or at least one time period) exceeds the frequency threshold and/or a criteria whether an average word count number for the respective keyword for the plurality of time periods exceeds the frequency threshold (or a second frequency threshold).

Preferably, the keywords, which do not meet the frequency test criteria such as the criteria above, are omitted in the further analysis. As discussed above, this may have the beneficial effect that the processing burden can be significantly reduced in the further analysis by omitting keywords with low occurrence frequency in one or more of the time periods, or on average, since the processing burden in determining correlation coefficients for the combinatory possible keyword pairs increases with $(N-1)N/2$ for $N$ non-omitted keywords.

Then, for the non-omitted keywords, the steps S44 and S45 as discussed in connection with FIG. 2A may be performed also in the process of FIG. 2B to determine correlation-linked keyword pairs among the combinatory possible keyword pairs of non-omitted keywords.

However, as a sort of additional "validation process", in particular parallel (or independent) of the correlation determination process of calculating correlation coefficients, the process includes a step S46 of performing a distance determination processing, in particular on an analysis performed not on the basis of data merged for each of the time periods, but on the basis of an analysis comment-by-comment.

Preferably, the distance determination processing is performed in step S46 to determine, for each of the plurality of (non-omitted) keyword pairs, a respective distance coefficient being associated with the respective keyword pair by analyzing the social media data (analysis input data) comment-by-comment (text document by text document) to determine the distance coefficient as a parameter indicating a relative distance of the keywords of the respective keyword pair in the respective user comments/text documents.

Accordingly, the respective distance coefficient is calculated as a parameter indicative of a relative distance of the keywords of the respective keyword pair in each respective text document of the pre-processed social media data.

The distance coefficient being associated with the respective keyword pair is preferably determined in a range between a maximum distance coefficient value, which indicates that the keywords of the respective keyword pair occur together, in particular close and/or next to each other, in plural text documents, and a minimum distance coefficient value, which indicates that the keywords of the respective keyword pair do not occur together in any of the user-created text documents.

For example, the distance coefficient may be determined in the range between zero and one, wherein a distance coefficient of zero may indicate that the two keywords of the respective keyword pair do not occur together in any of the user-created text documents (comments), to indicate that these keywords are never used by any user in the same user-created text document (comment) and therefore should preferably not be interpreted as correlation-linked, and a distance coefficient of zero may indicate that the two keywords of the respective keyword pair do always occur together in close proximity (e.g. in the same sentence, or within a range of a pre-determined minimum number of words) or even directly next to each other in the user-created text documents (comments), to indicate that these keywords are always used by users in the same user-created text document (comment) and therefore should preferably be interpreted as correlation-linked if a correlation link can be detected in step S45.

It is to be noted that there are languages in which close proximity of words in a sentence may be interpreted as close relation regarding the content and/or context, such as e.g. English or other European languages. That is, in English or other European languages, two words which occur close or even next to each other in a sentence may be related closely in terms of content and/or context. However, the algorithm of determining the distance coefficient may be optimized depending on the particular language(s) of the text documents. For example, in some Asian languages such as Chinese or Japanese, the opposite rules may apply such that words which have the largest physical distance in a sentence (e.g. being placed at the beginning and the end of a sentence) may be most closely related in terms of content and/or context.

Such distance coefficient may be calculated by assigning a (variable or fixed) value to a distance in a comment/text document, when the two keywords occur in the same comment/text document (in a simplest embodiment, this may assign a value to situations in which the two keywords appear in the same comment/text document, and in more sophisticated embodiments this may include varying the value based on the relative distance within the comment/text document (e.g. considering the language type as discussed above, e.g. close physical distance in a sentence or far physical distance in a sentence may indicate high contextual relationship depending on language type, wherein the contextual relationship is preferably the basis of the determination of the distance coefficient rather than the physical distance between terms in the sentence), and assigning a value of zero for comments/text documents in which only one of the two keywords or none thereof occurs in the respective comments/text documents. Then, the assigned values of the comments/text documents may be added together for each keyword pair, and be normalized by a normalization parameter which may depend on the word count of both of the respective keywords of the pair or only one thereof.

As mentioned, the distance coefficient may be calculated based common occurrence in the text document only, or even more accurately on physical distance in a sentence at least for languages such as English or other European languages. However, in preferred embodiments the distance coefficient is preferably calculated even more accurately based on semantic/logical distance (e.g. based on sentence structure, including subject-object structure or other characteristics of linguistic topology depending on the particular language of the text document), rather than just physical distance to better reflect actual linguistic topology of the particular language.

In some simple and efficient exemplary embodiments, the distance value for a certain keyword pair may be calculated as follows. Assume the number of comments/text documents which include both keywords of the two keywords of the respective keyword pair is M, while the respective word counts of the two keywords are WC1 and WC2 (this may be for one time period/data sample, or for all time periods/data samples combined cumulatively), then the distance coefficient may be calculated as (or based on) M/max(WC1, WC2), or 2M/(WC1+WC2), etc. In both cases, the distance coefficient may exemplarily normalized to the range of zero and one, preferably. In exemplary embodiments in which the keywords are counted only once per comment/text document (even if they appear two or more times in the same comment/text document), these coefficients M/max(WC1, WC2), or 2M/(WC1+WC2) would already by normalized since M would always smaller than or equal to each of WC1, WC2 and (WC1+WC2)/2.

As mentioned above, in other embodiments, a relative distance in the respective comments/text documents, in which both keywords occur, can be considered by assigning a value between 0 and 1 according to the relative distance, and adding these values together for all comments/text documents, in which both keywords occur. The values 1/max(WC1, WC2) or 2/(WC1+WC2) could still be exemplarily applied in such embodiments.

In other embodiments, the distance determination may also be based on a frequency analysis, which may be even more simple and more efficient, including a comparison of word counts.

For example, if two terms/keywords occur typically together in the same text document, the number of occurrences of the first keyword and the number of occurrences of the second keyword may be the same or at least be approximately equal in multiple data samples/time periods. Such algorithm may calculate word counts WC1 and WC2 for the two keywords (this may be for one time period/data sample, or for all time periods/data samples combined cumulatively), and then the distance coefficient may be calculated as (or based on) WC1/max(WC1,WC2), WC2/max(WC1, WC2), or (WC1+WC2)/[2 max(WC1,WC2)], etc.

Preferably, such parameters are calculated for more or all data samples, because it may accidentally happen that the word counts WC1 and WC2 are equal or approximately equal just as a coincidence, but if the word counts of the two terms are equal or approximately equal for many or even all data samples, it is a good and reliable indication that the terms often occur together in the same text documents.

Based on the above-determined distance coefficients for each of the keyword pairs (potentially omitting again the keywords that do not pass the frequency test of step S43), the process performs exemplarily the further step S47 of checking the correlation-linked keyword pairs of step S45 as to whether they have a low distance coefficient to validate the detected correlation.

In other words, the correlation criteria applied in the correlation-link identification processing S45 further includes another criteria applied in step S47 as to whether the determined distance coefficient associated with the respective keyword pair exceeds a distance threshold, and, the correlation-linked keyword pairs of step S45 which do not meet this other criteria are omitted in the correlation group identification processing of step S48.

FIGS. 4A to 4E exemplarily illustrate a flow chart of exemplary methods for performing data analysis processing according to some further embodiments. These may, for example, represent more specific examples for implementations of steps S42, S44 and S45 in FIG. 2A or of steps S42, S43, S44, S45, S46 and S47 in FIG. 2B above, but are not meant to limit the implementations of these above processes.

Figure 4A:
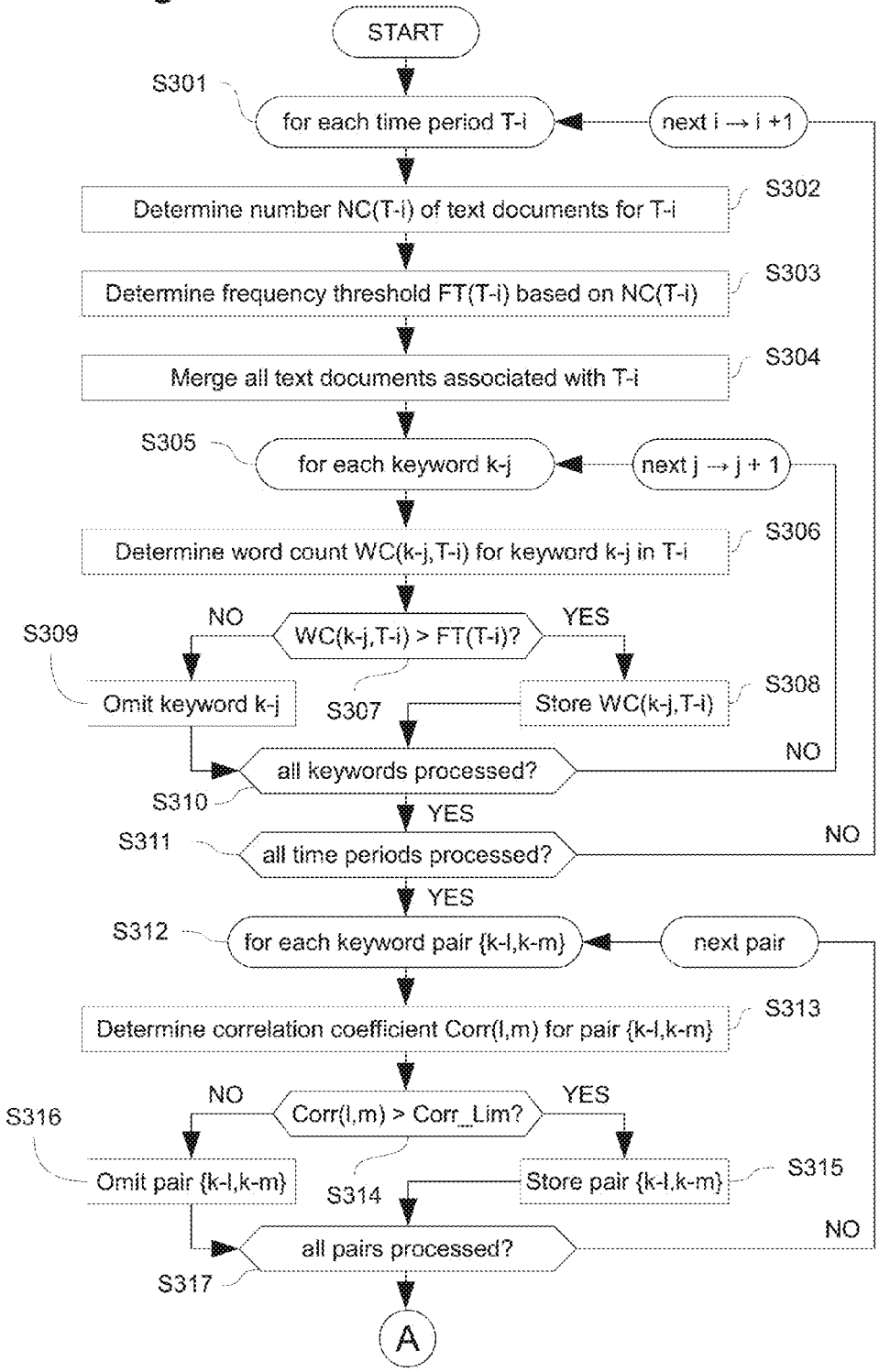
Figure 4B:
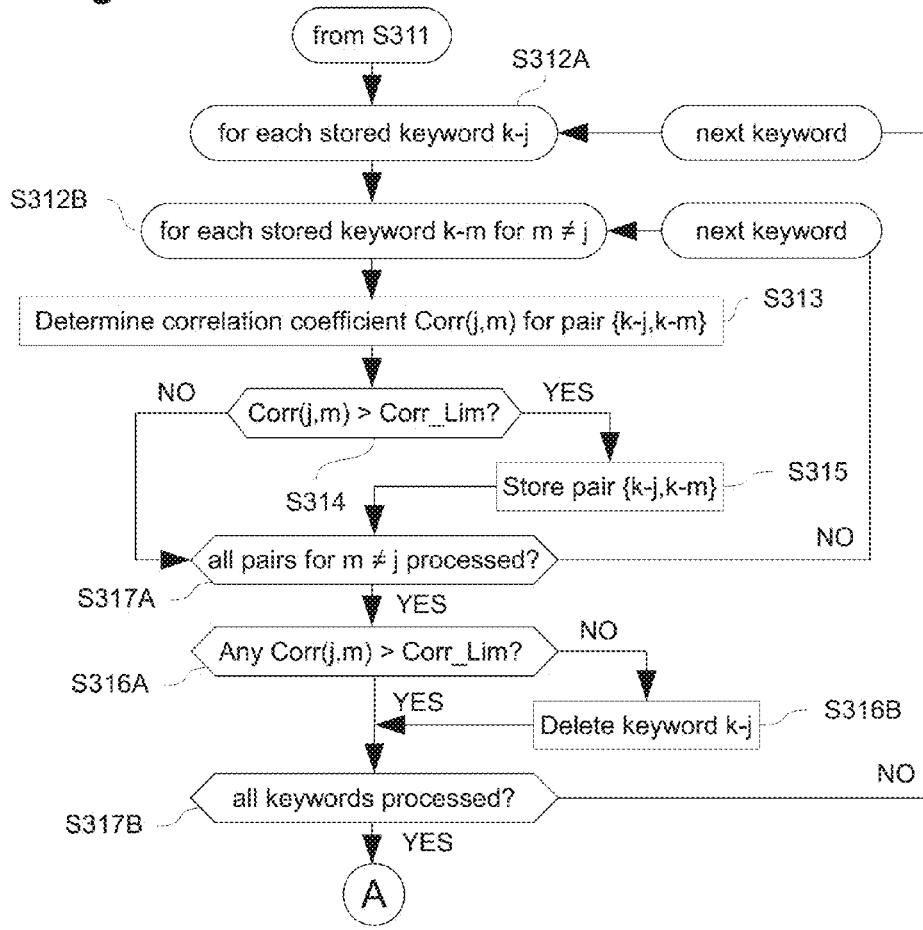
Figure 4C:
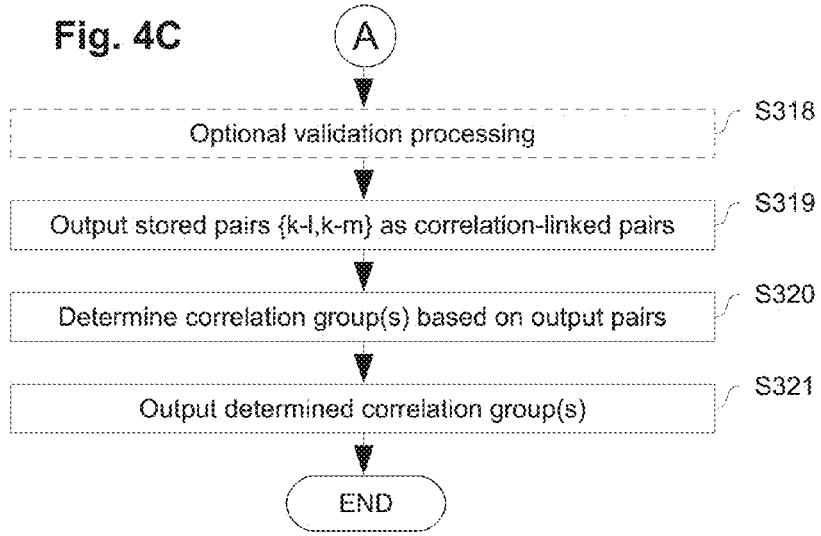

An exemplary method may be represented by the steps of the flow charts of FIGS. 4A and 4C. However, the step S318 of performing "validation processing" is optionally performed in some exemplary embodiments, but may be omitted in other exemplary embodiments. If validation processing is performed according to the optional step S318 in some embodiments, this may be done according to steps S47 and S47 as exemplarily discussed above, and/or it may be performed in some exemplary embodiments according to the optional process of FIG. 4D or according to the optional process of FIG. 4E. In some exemplary embodiments, the step S312 to S317 in FIG. 4A may be exemplarily replaced by the alternative sub-process of FIG. 4B, exemplarily.

Again, it is assumed that a database including a plurality of keywords is provided, and analysis input data including a plurality of text documents, such as e.g. social media data (including a plurality of user-created text documents/comments), is provided for a plurality of time periods T-i (as examples of data samples). The process exemplarily starts with step S301 for a first of the time periods T-i to be repeated in a loop for each of the time periods T-i (i going from 1 to the total number of time periods and/or data samples). In a step S302, a number NC(T-i) of comments for that time period T-i is determined, i.e. the number of all text documents (e.g. comments of the social media data) associated with the time period T-i e.g. based on a date of creation, a date of retrieval and/or a time stamp.

In step S303, a frequency threshold FT(T-i) is exemplarily determined based on the determined number NC(T-i) of text documents/comments for that time period T-i of step S302. For example, the threshold may be pre-defined as a certain percentage of all text documents/comments (e.g. a factor of P % means that the frequency threshold FT(T-i) may be determined based on or equal to P % of the determined number NC(T-i) of text documents/comments for that time period T-i of step S302, i.e. 0.01 times P times the determined number NC(T-i)). This is not meant to be limiting, and in other embodiments the threshold may be fixed to an overall pre-determined threshold value for all time periods/data samples).

In general terms, the data analysis processing of the analysis input data (e.g. social media data) may further include adjusting the frequency threshold applied to determined word count numbers for a certain time period (data sample) based on a total number of text documents being associated with the certain time period (data sample).

This has the advantage that the frequency threshold being applied is made variable and is adjusted based on the amount of user discussions that occurred during the respective time period, in order to not filter out the relevant topics that have been discussed over-average or to a certain extent during the respective time period even if the total amount of comments during the time period (in the data sample) was low with respect to other time periods (data samples).

In other exemplary embodiments, it is possible to adjust the frequency threshold applied to determined average word count numbers for the plurality of time periods (data samples) based on a total number of text documents of the plurality of time periods (data samples).

In step S304, all comments/text documents of the respective time period T-i are merged into a data structure (e.g. into a single file, or an associated multi-file).

The next sub-process then starts in step S305 for a first of the plural keywords k-j to be repeated in a loop for each of the plural keywords kj. In step S306, a word count WC(k-j,T-i) for the respective keyword k-j in the data for the respective time period T-i is determined, and step S307 checks whether the determined word count WC(k-j,T-i) for the respective keyword k-j in the data for the respective time period T-i exceeds the frequency threshold FT(T-i) determined in step S303.

If step S307 gives YES, the respective keyword k-j is stored in preliminary result data in step S308, and, if step S307 gives NO, the respective keyword k-j is simply omitted (or deleted in preliminary result data) in step S309. In other embodiments, the respective keyword k-j may be omitted only if it did not pass the frequency test of step S307 for a pre-determined number of time periods (data samples).

If the above sub-process has not been yet performed for all keywords k-j (step S310 gives NO), the method repeats the above by going to step S305 again for the next keyword (j→j+1). Otherwise (step S310 gives YES), the method continues with step S311. If the process has not been yet performed for all time periods T-i (step S311 gives NO), the method repeats the above by going to step S301 again for the next time period (i→i+1). Otherwise (step S311 gives YES), the method continues with step S312.

In the above, the method is exemplarily performed in a loop of keywords, implemented in a loop of time periods (data samples), but it is also possible to have a method in which the method may be performed in a loop of time periods (data samples), implemented in a loop of keywords (in particular in embodiments which do not vary the frequency threshold).

The next sub-process then starts in step S312 for a first of the plural keyword pairs {k-l,k-m} to be repeated in a loop for each of the plural keyword pairs {k-l,k-m}.

In step S313, for the current keyword pair {k-l,k-m}, the associated correlation coefficient Corr(l,m) is determined based on the samples, for all time periods T-i, of WC(k-l,T-i) and WC(k-m,T-i), i.e. whether the samples WC(k-l,T-1), WC(k-l,T-2), WC(k-l,T-3), are correlated with the samples WC(k-m,T-1), WC(k-m,T-2), WC(k-m,T-3), . . . , etc. In step S314, according to a criteria of the correlation criteria, it is checked whether the calculated correlation coefficient Corr(l,m) associated with the current keyword pair {k-l,k-m} exceeds the correlation threshold Corr_Lim. If step S314 gives NO (no or low likelihood of correlation), the current keyword pair {k-l,k-m} is omitted (or deleted) in step S316, but if the step S314 gives YES (medium and/or high likelihood of correlation), the current keyword pair {k-l,k-m} is stored in preliminary result data in step S315.

If the above sub-process has not been yet performed for all keyword pairs {k-l,k-m} (step S317 gives NO), the method repeats the above by going to step S312 again for the next keyword pair (l→l+1 and/or m→m+1). Otherwise (step S317 gives YES), the method continues with step S319 (or the optional sub-process of step S318 of optional validation processing, as e.g. explained in connection with an exemplary sub-process in FIGS. 4D and/or 4E).

In step S319, the method outputs the stored keyword pairs determined in steps S314 and S315 (or still stored after the optional sub-process of FIGS. 4D and/or 4E) as correlation-linked keyword pairs, and determines the respective correlation group(s) in step S320, and outputs the identified correlation group(s) in step S320 as analysis results in step S321.

In another alternative approach, which is efficient in processing burden, the sub-process of the exemplary FIG. 4B may be performed between step S311 of FIG. 4A and step S319 (or S318) of FIG. 4C.

Here, the steps S313, S314 and S315 may be performed similar as described above, however, the sub-process is exemplarily not performed in a loop of keyword pairs but in two loops of keywords. The first loop is performed for each (still stored) keyword k-j between step S312A to S317B in FIG. 4B, and the second loop is performed inside the first loop for each (still stored) keyword k-m (different than keyword k-j, i.e. for j not being equal to m) between step S312B and S317A.

Exemplarily, after completing the second loop for all keyword pairs k-j and k-m (for j not being equal to m) for this current keyword k-j (when step S317A gives YES), it is checked in step S316A whether the correlation criteria of step S314 was met for any of the keyword pairs k-j and k-m (for j not being equal to m) for this current keyword k-j. If the answer is NO in step S316A, i.e. the current keyword k-j was not correlation-linked to any of the still stored keywords k-m (for j not being equal to m), this keyword k-j has no correlation link to any of the remaining stored keywords and can be deleted in step S316B prior to entering the first loop again for the next keyword, so that it may be neglected in all following second loops for all further keywords to be processed in the first loop, thereby advantageously reducing the processing burden in the processing of the further keywords until step S317B retunes YES, and the method may continue with step S318 or S319 of FIG. 4C.

As mentioned further above, the sub-process of validation processing (to validate the identified correlation-linked keyword pairs) may be performed as described in the exemplary process of FIGS. 4D and/or 4E, which may follow step S317 (from FIG. 4A) or S317B (from FIG. 4B) above (or be performed in parallel and independently for all possible keyword pairs in other embodiments).

It is to be noted that step S316B "delete keyword k-j" is intended to make sure that the particular keyword k-j is not considered anymore, e.g. it is not considered in the subsequent check of step S317B, and if the process loops back to step S312A (or to step S312B in the sub-process) the deleted keyword(s) of step S316B is/are not considered anymore in preferred embodiments.

In FIG. 4D, exemplarily, in step S322 the method of the sub-process executes for all keyword pairs {k-l,k-m} stored in the preliminary result data after steps S315 and S317 (or S317B) gives YES. Alternatively, the sub-process may be performed in parallel and independently, e.g. based on all possible keyword pairs {k-l,k-m} of the keywords of the database (or a pre-determined set thereof).

As to the relevant keyword pairs, the sub-process is performed for each text document/comment (comment-by-comment, or text document by text document), cf. step S323. The process exemplarily checks whether any of the keywords k-l and k-m of the current keyword pair {k-l,k-m} occurs at least once in the current comment/text document in steps S324 and S325, and goes to the next keyword pair if both steps S324 and S325 give NO or if at least one of the steps S324 and S325 gives NO. Otherwise, if steps S324 and S325 both give YES, i.e. both keywords k-l and k-m of the current keyword pair {k-l,k-m} each occur at least once in the current comment/text document, the sub-process determines a relative distance parameter for this comment for the current keyword pair {k-l,k-m}.

If the above sub-process has been performed for all text documents/comments (step S327 gives YES), the relative distance parameter for the comments of steps S326 for the current keyword pair {k-l,k-m} are used to determine the distance coefficient DC(k-l,k-m) for the current keyword pair {k-l,k-m}. This may be performed as described in some embodiments above, e.g. including a normalization step. The distance coefficient DC(k-l,k-m) for the current keyword pair {k-l,k-m} indicates a relative distance of the keywords k-l and k-m in the comments/text documents, i.e. whether they are likely to appear in the same comments together, or even in close proximity in the text documents/comments themselves (e.g. under considerations as exemplarily explained in connection with step S46 above).

In step S328, as another exemplary criteria of the correlation criteria, it is checked whether the distance coefficient DC(k-l,k-m) for the current keyword pair {k-l,k-m} exceeds the distance threshold Dist_Lim. If step S329 gives NO, the current keyword pair {k-l,k-m} is omitted (e.g. deleted from the stored preliminary result data) in step S330. That is, even of the current keyword pair {k-l,k-m} would be correlation-linked according to the correlation coefficient Corr(l,m) above, the correlation could be disregarded due to lack of validation, as the keywords may appear to be statistically correlated based on word count correlations but do not likely appear in the same text documents/comments indicating that these keywords may not be correlated in a contextual sense. That is, the pair omitted in step S330 may be disregarded in the later identification of correlation groups e.g. in step S320.

Otherwise, if step S329 gives YES, the current keyword pair {k-l,k-m} may be linked according to a contextual correlation as they seem to be used in close proximity or at least in the same text documents/comments, and may therefore validate any potential statistical correlation determined based on word count numbers. Therefore, the validated current keyword pair {k-l,k-m} (i.e. if step S329 gives YES) can be stored or kept stored in the preliminary result data, to be used in the later identification of correlation groups.

If the sub-process has been performed for all keyword pairs {k-l,k-m} (step S332 gives YES), the method may continue with step S319 (FIG. 4C) above, and, otherwise, the loop may be repeated for the next keyword pair by going to step S322 again for the next keyword pair (l→l+1 and/or m→m+1).

In another alternative approach, which is efficient in processing burden, the sub-process of the exemplary FIG. 4E may be performed instead of the sub-process of FIG. 4D. Here, the steps S323, S324, S325, S326, S327, S328, S329, and S331 may be performed similar as described above, however, the sub-process is exemplarily not performed in a loop of keyword pairs but in two loops of keywords. The first loop is performed for each (still stored) keyword k-l between step S322A to S332B in FIG. 4E, and the second loop is performed inside the first loop for each (still stored) keyword k-m (different than keyword k-l, i.e. for l not being equal to m) between step S322B and S332A in FIG. 4E.

Exemplarily, after completing the second loop for all keyword pairs k-l and k-m (for l not being equal to m) for this current keyword k-l (when step S332A gives YES), it is checked in step S330A whether the correlation criteria of step S329 was met for any of the keyword pairs k-l and k-m (for l not being equal to m) for this current keyword k-l. If the answer is NO in step S330A, i.e. the current keyword k-l was not distance-correlation-linked to any of the still stored keywords k-m (for l not being equal to m), this keyword k-l has no distance-correlation-link to any of the remaining stored keywords and can be deleted in step S330B prior to entering the first loop again for the next keyword, so that it may be neglected in all following second loops for all further keywords to be processed in the first loop, thereby advantageously reducing the processing burden in the processing of the further keywords until step S332B returns YES, and the method may continue with step S319 of FIG. 4C.

Figure 5:
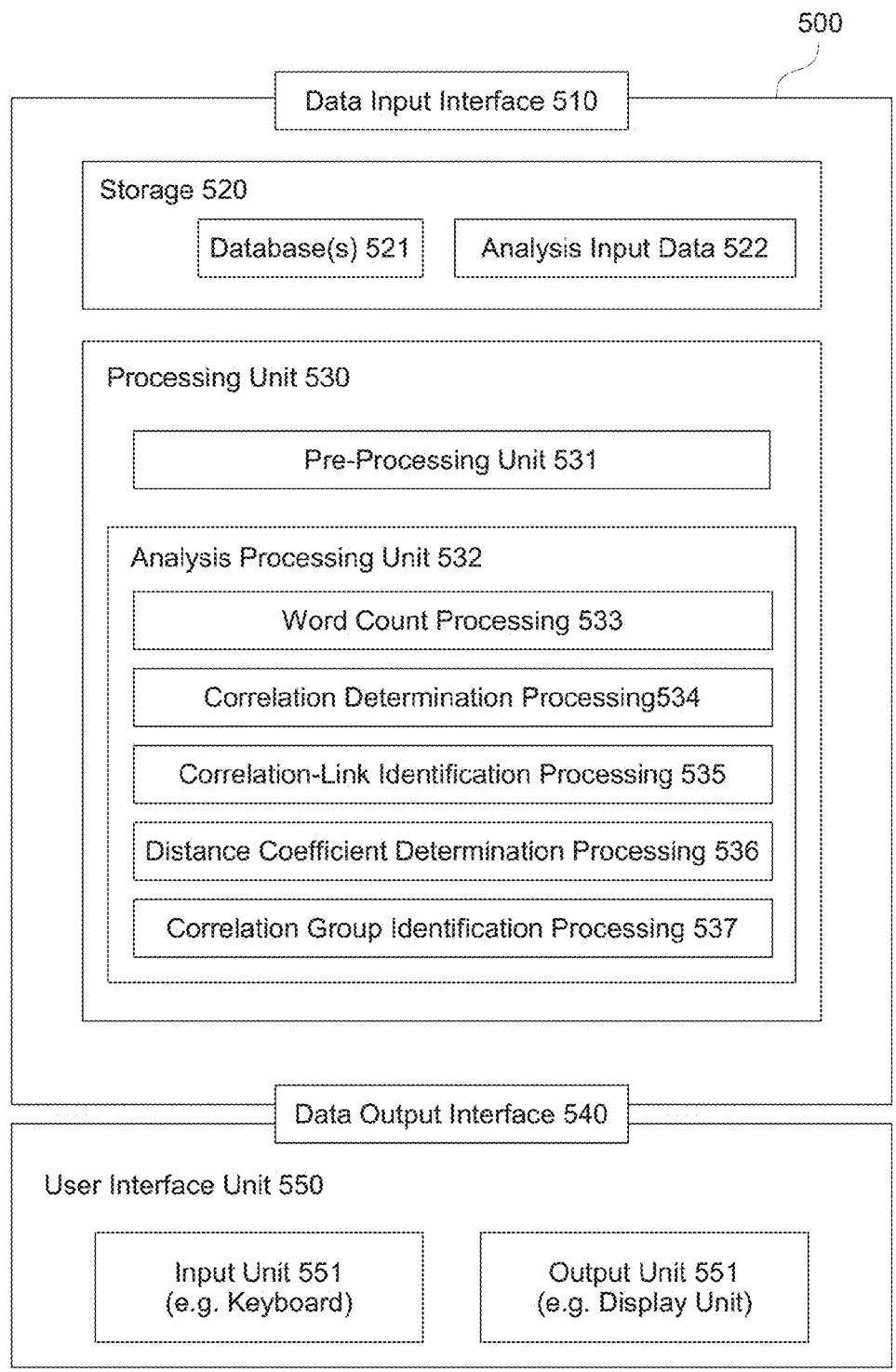
FIG. 5 exemplarily shows a schematic diagram of an apparatus for executing an automated analysis of analysis input data according to some exemplary embodiments.

FIG. 5 exemplarily shows a schematic diagram of an apparatus 500 for executing an automated analysis of analysis input data (e.g. social media data and/or other types of data as mentioned above) according to some exemplary embodiments.

The apparatus 500 may include a storage 520 configured to store one or more databases 521 indicative of a plurality of keywords; and a data input interface 510 configured to provide/obtain analysis input data from one or more data sources, the analysis input data including a plurality of text documents respectively being associated with at least one of the plurality of data samples (e.g. time periods and/or geo-location); wherein the analysis input data 522 may also be stored to storage 520.

The apparatus 500 further comprises a processing system 530 having a pre-processing unit 531 configured to execute pre-processing the provided/obtained analysis input data to generate pre-processed analysis input data available for data analysis processing by the data analysis processing unit 532 of the processing system 530. The processing system 530 is configured to execute the data analysis processing of the analysis input data by the data analysis processing unit 532.

The data analysis processing unit 532 includes a word count processing unit 533 to determine word count numbers indicative of occurrence frequencies for keywords of the database in the text documents of the pre-processed analysis input data for each of the plurality of data samples (e.g. time periods), a correlation determination processing unit 534 to determine, for each of a plurality of keyword pairs, a respective correlation coefficient being associated with the respective keyword pair, the respective correlation coefficient being indicative of a quantitative measure of correlation between the determined word count numbers of the keywords of the respective keyword pair for the plurality of data samples (e.g. time periods), a correlation-link identification processing unit 535 to identify correlation-linked keyword pairs, wherein keywords of a keyword pair are determined to be correlation-linked to each other based on a correlation criteria, the correlation criteria including a criteria whether the determined correlation coefficient associated with the respective keyword pair exceeds a correlation threshold, and a correlation group identification processing unit 537 to identify correlation groups of keywords based on the identified correlation-linked keyword pairs, each correlation group including keywords of at least one correlation-linked keyword pair and, for each keyword included in the respective correlation group, the respective correlation group further includes the other keywords identified to be correlation-linked to the respective keyword.

The processing system may be implemented to execute one or more of the above computer-implemented methods. In exemplary embodiments, the apparatus 500 further includes a distance coefficient determination processing unit 536 to calculate a distance coefficient for keyword pairs of the data base based on the social media data.

The apparatus further may comprise a data output interface 540 configured to output, if one or more correlation groups of keywords are identified, analysis result data indicative of at least one of the one or more identified correlation groups of keywords. The data may be output through a output unit 552 of a user interface 550 (e.g. a graphical user interface, including a display as at least part of the output unit 552) having also a user input unit (e.g. including input means such as a touch screen, a computer mouse, a keypad, or other computer-implemented human machine interface input tools).

Figure 6A:
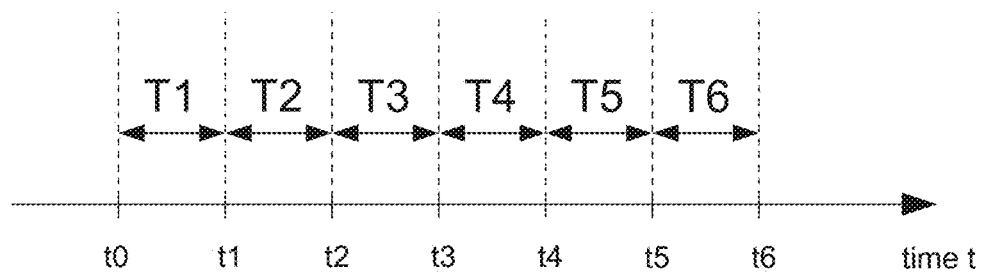
FIGS. 6A and 6B exemplarily illustrate examples of arrangements of time periods.
Figure 6B:
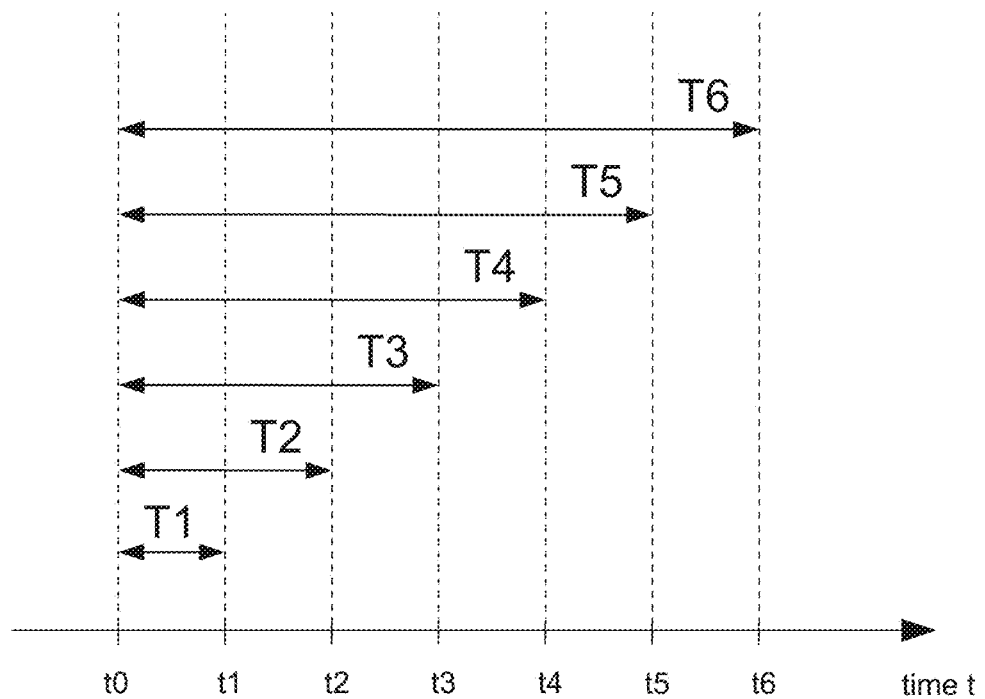

FIGS. 6A and 6B exemplarily illustrate examples of arrangements of time periods, as examples of data samples in above and below processes, exemplarily of respective time periods T1 to T6 in between times t0 and t6.

As in FIG. 6A, the time periods T1 to T6 may exemplarily be arranged successively and each time period T-i is followed by time period T-i+1 and, in particular, time periods T1 to T6 do exemplarily not overlap. The unit of the time periods may be day, month, year or others, also at different duration times or same duration times as in FIG. 6A. It is to be noted that in an example in which time periods do not overlap, each comment/user-created text document is associated with one single time period.

As in FIG. 6B, the time periods T1 to T6 may exemplarily be arranged cumulatively and each time period T-i is followed by time period T-i+1 but includes time period T-i and, in particular, time periods T1 to T6 do exemplarily overlap. The unit of the time period T1 may be day, month, year or others. It is to be noted that in an example in which time periods do overlap, a comment/user-created text document may be associated with plural time periods. For example, in FIG. 6B, all comments associated with the first time period T1 would be associated also with each of the other time periods T2 to T6 but comments created in between times t5 and t6 would only be associated with the sixth time period T6 (and potential higher numbered time periods, if any).

In further embodiments based on the above aspects and embodiments, the database may include a plurality of search terms being surjectively mapped onto the plurality of keywords, preferably such that each search term is mapped to one of the plurality of keywords and/or each keyword is associated with one or more of the plurality of search terms being mapped to the respective keyword. In this context, a surjective mapping means that each search term is mapped to a single keyword, but each keyword may have zero, one or plural search terms being associated with the respective keyword. Herein, the term "search term" may represent a pre-defined string of characters, such as single words, combinations of two or more words, numbers, combinations of numbers and words, or others.

Preferably, the pre-processing to generate the pre-processed social media data includes identifying occurrences of search terms in the user-created text documents and replacing the identified search terms by their respective associated keywords based on the database. For example, this may converting words (search terms) to a single word (keyword) using the database/dictionary. For example, all words associated to cold weather condition could be replaced by one word, say "cold_weather", for example, as an exemplary keyword.

This has the advantage that the number of searched keywords can be reduced in the following processing since a higher number of search terms is mapped to a lower number of keywords, so that especially word count processing, correlation determination processing and/or distance determination processing may be performed at lower processing burden and storage or memory usage.

However, this has another significant advantage that statistical correlations due to higher frequency occurrences of keywords can be achieved by mapping plural related search terms to a synonymous or more general summarizing keyword that has an association to the search terms. For example, in the regular usage of words, there may occur situations in which plural search terms represent synonyms to each other, and these may be mapped to one single synonymous keyword to reduce processing burden and increase statistical significance in the later processing to higher number of average word counts for the keyword compared to the single frequency occurrences of the single search terms. Also, for example, users sometimes describe higher or lower degree of details on some topics. If the analysis is not dependent on too high a degree of detail, it is possible to summarize a plurality of more detailed search terms by a single summarizing keyword, also to reduce processing burden and increase statistical significance in the later processing to higher number of average word counts for the keyword compared to the single frequency occurrences of the single search terms.

Preferably, as an alternative example to the above aspect of replacing the identified search terms by their respective associated keywords (or as additional validation calculation), word count processing may include determining word count numbers indicative of occurrence frequencies for search terms of the database in the user-created text documents of the pre-processed social media data for each of the plurality of time periods, and adding, for each of the plurality of time periods, the determined word count numbers for all search terms mapped to the same keyword to determine the respective word count number for the respective keyword. This still has the advantage that processing burden in the later correlation related processing can be reduced significantly. However, replacing search terms by keywords prior to word count processing is more efficient because the processing burden can be reduced already for the word count processing.

Specifically, it may be preferable that a correlation group of correlation-linked keywords is analyzed as to whether the keywords of the correlation group may be used to form a "correlation sentence" in the sense that the correlation group at least includes a keyword for each of a plurality of sentence-relevant categories. For example, a "correlation sentence" may be formed, in some embodiments, for detecting product failure, if the identified correlation group at least includes a keyword of a category of product names or part names that is found to be correlated (correlation-linked) to a keyword of a category of keywords indicating product failure or product problems.

Preferably, the method may comprise identifying one or more correlation groups of keywords which contain at least one keyword being associated with each of a pre-determined set of two of more categories of the database. This has the advantage that a sentence criteria may be implemented. It is possible to provide the sentence criteria to be applied to a correlation group indicating that the correlation group allows to extract a correlation sentence if the correlation group includes at least one keyword for each of a plurality of pre-defined sentence-relevant categories. The set of sentence-relevant categories may represent all available categories of the database or a subset of at least two of the available categories of the database.

Preferably, the categories (or the sentence-relevant categories) may include one or more of: a manufacturer category including keywords associated with manufacturer's names, in particular names of automotive manufacturers; a product category including keywords associated with products or product models, in particular automobile models; a part category including keywords associated with parts of products or product models, in particular automobile parts; a malfunction category including keywords associated with product malfunction or failures; a category including keywords associated with problems being resolved and/or normal functioning of a product or product part; a weather category including keywords associated with weather attributes; and/or a location category including keywords associated with locations, in particular regions, countries, states, and/or cities.

For example, if a correlation group of correlation-linked keywords includes at least one correlation-linked keyword for each of the categories: at least one keyword from the product category and/or at least one keyword from the part category, at least one keyword from the manufacturer category and at least one keyword from the malfunction category, it is possible to extract a correlation sentence of the respective keywords indicating that a certain product and/or part of the product of a certain manufacturer may have been detected to have a failure problem, so that the failure detection may be achieved based on the social media data. Other additional correlation-linked keywords from other categories may include additional contextual information added to the detected correlation sentence or the detected product failure. This may be analyzed further by extracting the related comments/user-created text documents to analyze the detected problem.

If the problem is validated or already based on the identified correlation group, this may allow to initiate a recall operation much earlier and at much lower costs than in past situations without social media analysis.

In further embodiments, the method may further comprise adjusting the correlation criteria based on one or more of the criteria: if no correlation-linked keyword pair is identified in the correlation-link identification processing, if no correlation group is identified in the correlation group identification processing, if the maximum number of keywords occurring in the identified correlation groups is lower than a pre-set threshold, and/or if the average number of keywords in the identified correlation groups is lower than a pre-set threshold; and repeating the correlation-link identification processing and the correlation group identification processing based on the adjusted correlation criteria.

In further embodiments, the method may further comprise adjusting the correlation criteria if no correlation group, which contains at least one keyword being associated with each of a pre-determined set of two of more categories of the database, is identified; and repeating the correlation-link identification processing and the correlation group identification processing based on the adjusted correlation criteria.

The above may automatically adjust the correlation threshold, a frequency threshold, and/or a distance threshold.

In all of the above embodiments and aspects, the methods may further include a step of updating the database, e.g. by including additional keywords and/or search terms, by adding additional common reference phrases, etc. This may be done by manual analysis of keyword extractions, e.g. by analyzing comments and keywords and/or search terms extracted therefrom, and analyze whether the appropriate terms have been extracted. The whole analysis process or parts thereof may then be repeated based on the updated database. Aside of manual analysis and updating of the database/dictionary, preferred aspects may update the database based on machine learning algorithms. This process is repeated for a fixed number of times MF2. For example, the process of refining the word search and updating the database/dictionary can be accomplished using machine learning, for example, the instance-based machine learning algorithms like the k-Nearest Neighbour (kNN), Learning Vector Quantization (LVQ) and Self-Organising map (SOP).

Figure 7:
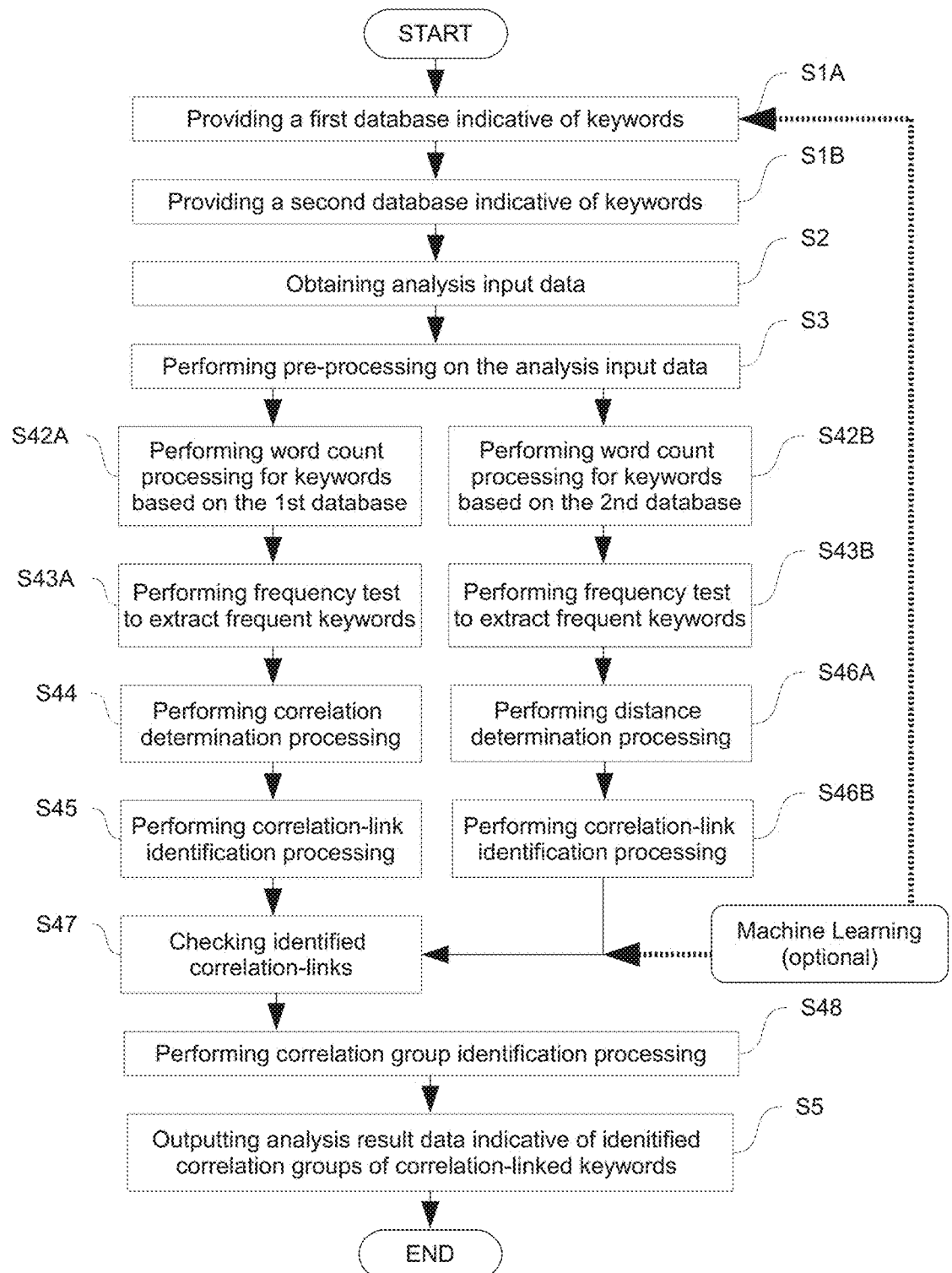
FIG. 7 exemplarily illustrates a flow chart of another method for an automated analysis of analysis input data according to some exemplary embodiments.

FIG. 7 exemplarily illustrates a flow chart of another method for an automated analysis of analysis input data according to some exemplary embodiments, specifically based on FIGS. 1 and 2B. The process of FIG. 7 is based on exemplary embodiments above, and the description shall be considered mainly on differences, and more detailed sub-processes may use features or aspects previously discussed in the description of processes and sub-processes such as e.g. described in connection with FIGS. 4A to 4E or partial aspects thereof.

The steps S2 and S3 in FIG. 7 may be performed similar to steps S2 and S3 in FIG. 1 above. However, exemplarily, instead of only one database, the process of FIG. 7 exemplarily provides two databases in steps S1A and S1B, for example, a first data based indicative of a plurality of keywords and a second database indicative of a plurality of keywords. For example, the first data base may be a specialized databased such as a specified dictionary relating to the field of purpose of the data analysis.

For example, when the embodiments are exemplarily applied to the automotive field, e.g. for the purpose of failure detection and/or recall situation prediction, the first database may be a specialized dictionary or specialized combination of specific dictionaries such as e.g. the library of predefined automobile dictionaries of words as discussed further above. On the other hand, the second database may be a more broad common dictionary used to include many if not all terms used in a certain or more certain languages. In some exemplary embodiments, it is even possible to utilize a machine learning process in which each word that is used in at least one of the text documents of the analysis input data (or the pre-processed analysis input data) is added to the second database if it is not yet included) and optionally to repeat word count processing and later processing such as distance determination processing based on the second database after the update of the second database.

In general terms, it is preferable in exemplary embodiments that the first database includes a plurality of keywords, and the second database includes the same plurality of keywords as the first database and additional keywords not included in the first database (i.e. the size of the first database is smaller than the size of the second database, and the first database data is part of the second database data).

In FIG. 7, the steps S42A, S43A, S44 and S45 may be performed similar to the respectively corresponding steps S42, S43, S44 and S45 of FIG. 2B. However, the word count processing in step S42A is based on the first database, i.e. the processing counts number of occurrences in the text documents of the analysis input data for keywords included in the first database provided in step S1A. It is to be noted that the process may only output correlation-linked keyword pairs including keywords that are indicated in the first database.

Preferably in parallel (or before or after), the process of FIG. 7 performs a validation processing independently based on a distance performance processing (similar to e.g. step S46 in FIG. 2B and/or based on a sub-process such as e.g. illustrated in FIG. 4D or FIG. 4E). However, instead of using the results of the word count processing of step S42A, the sub-process of the validation processing includes an independent word count processing step S42B using the second database provided in step S1B. Accordingly, the word count processing in step S42B is based on the second database, i.e. the processing counts number of occurrences in the text documents of the analysis input data for keywords included in the second database provided in step S1B.

Similar to step 43A (or step 43 discussed above), an optional step S43B of another frequency test is performed to extract frequent keywords (and omit less frequent keywords to reduce the processing burden in the steps S46A and S46B). Again, the frequency test may use a fixed frequency threshold (which may be the same or different than a threshold as used in step S43A only if S43A makes use of a fixed frequency threshold), or which may be based on a dynamic threshold determined as discussed above, e.g. based on the number of text documents per data sample (e.g. time period).

In step S46A, the method of FIG. 7 exemplarily includes a step of performing distance determination processing (e.g. as discussed above), to determine keyword pairs (of keywords of the second database) which are likely to occur in same text documents (or even contextually close inside individual text documents) by determining distance parameters and/or distance coefficients as in some of the above embodiments (exemplarily referred to as correlation-link identification processing in step S46B, in the sense that a distance-correlation-link may be detected, while S45 identifies frequency-correlation-link may be detected). It is to be noted that the process may only output distance-correlation-linked keyword pairs including keywords that are indicated in the second database. These may both also be included in the first database, however, step S46A and S46B may additionally output keyword pairs (identified as distance-correlation-linked keyword pairs) which include one or two keywords not included in the first database.

In optional exemplary embodiments, this aspects may be advantageously used for another method of machine learning, in which the first database can be updated e.g. by adding a keyword, which is not yet included in the first database but was identified in step S46B to be distance-correlation-linked to a keyword that was already included in the first database, into the first database. Also, the machine learning may include adding, to the first database, both keywords if a keyword pair was identified in step S46B to be distance-correlation-linked to each other in the analysis input data but none of these two keywords was previously included in the first database. Upon updating the first database, the process may optionally repeat steps S42A, S43A, S44 and/or S45, at least partially, based on the additional keywords of the updated first database.

In step S47, the frequency-correlation-linked keyword pairs identified in step S45 (after the initial processing and/or after repeating the processing based on the updated first database) may be checked against the distance-correlation-linked keyword pairs identified in step S46A (similar to step S47 in FIG. 2B above, and/or also in connection with an algorithm as shown in FIGS. 4A to 4E), and only keyword pairs identified in both steps S45 and S46A may be used in the step S48 of performing the correlation group identification processing to output the identified correlation group(s) in step S5 similar to FIG. 1 above.

Figure 8:
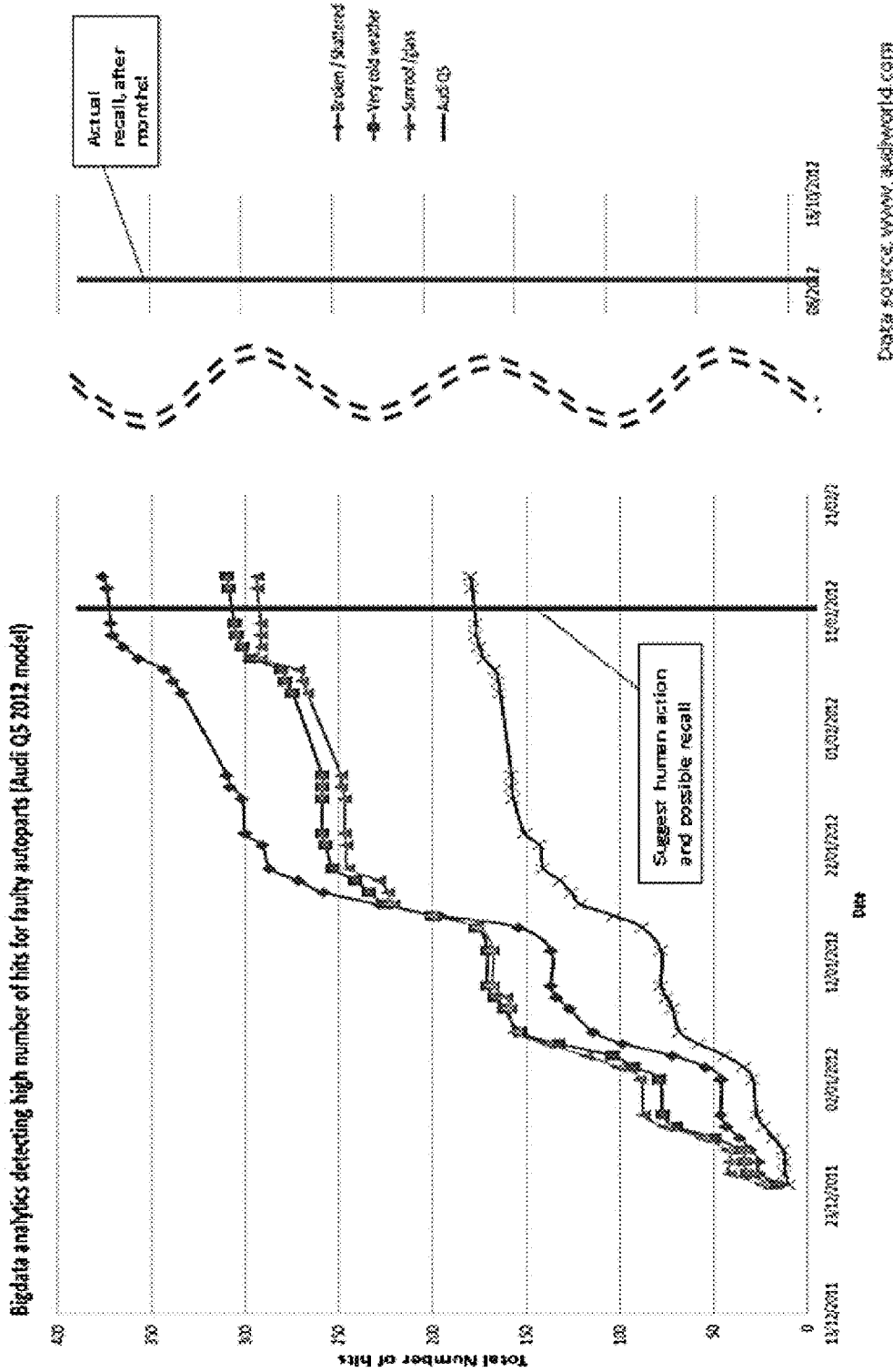
FIG. 8 is a diagram showing example results of a case study of an algorithm for performing data analysis according to FIG. 7.
Figure 9:
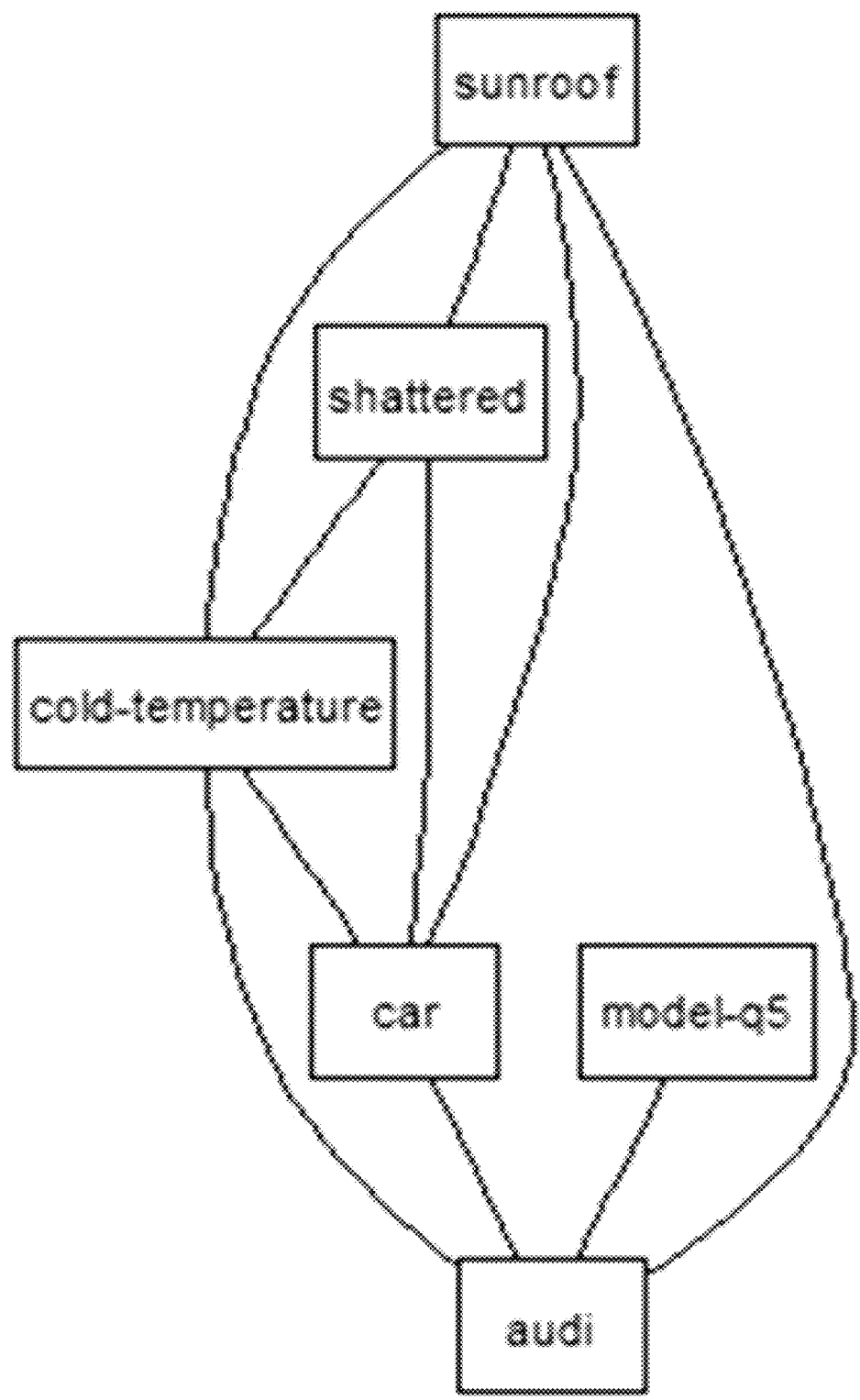
FIG. 9 shows a diagram of the correlation group of correlation-linked keywords of example results of a case study of an algorithm for performing data analysis according to FIG. 7.
Figure 10:
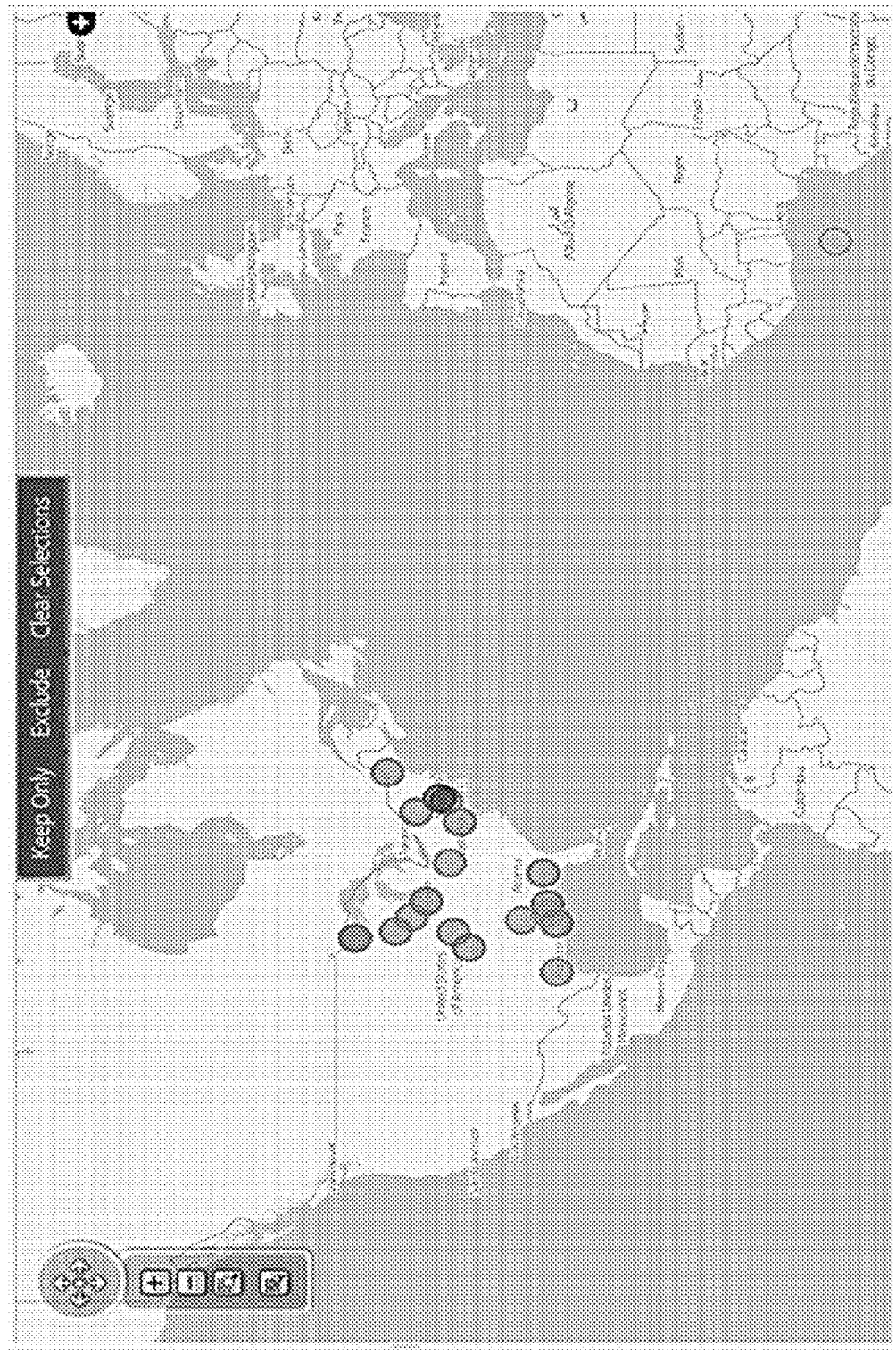
FIG. 10 shows a diagram of a map with geo locations of comments from the example results of a case study of an algorithm for performing data analysis according to FIG. 7.

FIGS. 8 to 10 show example results of a case study of an algorithm for performing data analysis according to FIG. 7.

Specifically, FIG. 8 exemplarily shows a cumulative development of hits per day (word counts per day) for the keywords "shattered/broken", "very cold weather", "sunroof/glass" and "Audi Q5", and the correlation is even visually visible in FIG. 8. FIG. 9 exemplarily shows the correlation group of correlation-linked keywords, the lines representing the identified correlation-links. FIG. 10 exemplarily shows the geo locations of comments involved in the analysis.

In this case study, the algorithms according to FIG. 7 has been exemplarily tested with users' comments in an Audi automotive social media forum http://www.audiworld.com/ of the year 2012.

As can be seen from FIG. 8, the trend of a keyword discussion can easily be visualized together with associated keywords that follow the same daily trend. One can easily see group of keywords that are being used at the same or correlated frequency for each day over a given time frame d. In other words, one can see if keyword k-i is being mentioned at the same or correlated frequency as keywords k-j and k-k for example.

The visual correlation of the words will already send signals that words which are used at the same frequency might have some relationship. This means that the visual correlation plot might give some insights about the nature of the fault and what the causes are.

After the validation test (e.g. the additional optional validation process had been exemplarily applied), the only surviving set of correlation-linked keywords of an identified correlation group and the sub-graph thereof as shown exemplarily in FIG. 9 reveal an Audi Q5 model, whose glass (panoramic) sunroof is susceptible to breakage under very cold temperatures. In August 2012, there was a recall of this Audi model due to some safety risks posed by the sunroof defect. The detected keywords and attributes that passed the validation test are shown in FIG. 9 as a cluster graph similar to the example of FIG. 3.

Accordingly, the results in can be displayed in the form of correlation network or cluster graph as exemplarily shown in FIG. 9. This network clusters together and links those keywords that are correlated with a correlation limit of at least corr_Lim.

The hits can also be displayed in a map to show the geo location where the hits are occurring as shown exemplarily in FIG. 10.

The algorithm was advantageously able to raise a red flag based on social media data obtained until six months prior to the recall date which would have implied potential cost saving for the OEM if the methods had been applied to social media data of 2012. This implies that the potential recall situations may be predicted or detected earlier in the future based on the embodiments and examples of the present disclosure on live obtained social media data, which implies very significant potential of cost savings but also of driver safety due to early detection of potential safety related issues.

In the above examples and embodiments, the correlation coefficients have been calculated for pairs of two keywords, and potential correlations between three or more keywords have been neglected. In further embodiments, it is additionally possible to use correlations between three or more keywords in the checking of the correlation criteria.

For example, while for three keywords x, y and z, a correlation respective correlation coefficient Rxy, Rxz, and Ryz would be calculated for the keyword pairings {x,y}, {x,z} and {y,z}, respectively, it is further possible to calculate one or more correlation coefficients e.g. for each of a potential correlation of one of the three keywords x, y and z to the keyword pair of the other two keywords.

For example, to calculate a correlation of the keyword z to the keyword pair {x,y}, the correlation coefficient could be calculated as:

$$R(z; x, y) = \sqrt{\frac{Rxz^2 + Ryz^2 - 2\ Rxz\ Ryz\ Rxy}{1 - Rxy^2}}$$

Then, instead or in addition to the two-parameter correlation coefficients, the three-parameter correlation coefficients may be checked against a correlation threshold in the correlation criteria to determine correlation linked groups of keywords.

In aspects and embodiments, one or more correlation groups of correlation-linked keyword pairs can be output as analysis result data. It is possible to visualize the results in plural ways, such as e.g. in the form of lists, tables, cluster graphs etc.

In aspects and embodiments, one or more correlation groups of correlation-linked keyword pairs can be output as analysis result data. It is possible to visualize the results in plural ways, such as e.g. in the form of lists, tables, cluster graphs etc. Also, word counts development over time or cumulative word count development over time may be plotted.

For example, correlation results may be visualized per vehicle brand, or per vehicle model; correlation results may be visualized in continuous manner over time, or per region; correlation results may be visualized as event-based with predefined attributes (e.g. region, time); correlation results may be visualized as figure (e.g. plot figure), text (e.g. part+failure statement+time+region), or the combination of both; and/or correlation results and level of details may be visualized as requested by customers via an interactive visualization interface (e.g. the user interface 550 above).

Aspects and exemplary embodiments may be used to realize in batch analytics of social network data to detect vehicle part failure detection, and provided as service to OEM to assist decision making for eventual recall.

Aspects and exemplary embodiments may be used to provide results to other service providers e.g. garage and repair centers to forecast repair services provisions Aspects and exemplary embodiments may also rely on additional information, e.g. on other data sources such as e.g. in-vehicle-sensor data may be considered, or data collected from car repair centres. Stream based analytics tool may be used for such data analytics. For this purpose, the data dictionary may be further extended to include OBUII structure data.

Aspects and exemplary embodiments may be used, when refining data dictionary with sentiment keyword, to detect driver impression of vehicle features, for other purposes. For example, if the data dictionary includes positive attributes such as "like", "appreciated". The algorithm can be used to identify the most welcomed feature by customer of a specific model. OEM may use such information for other purposes such as advertisement, integration of feature in future vehicle design etc.

Aspects and exemplary embodiments may be modified additional features and sub-processes not listed above.

For example, the time window for data extraction may be dynamically adjusted, e.g. based on data availability from data sources.

For example, the stamping of data/comments may be further improved, during the data extraction and cleaning phases, e.g. to consider the time offset between comment posted time and problem statement time.

For example, if a comment is posted (created) on day T, stating that the problem occurs since two weeks. The time stamp may be adjusted as T−14 days. Similar approach may be used for other stamping e.g. location stamping.

For example, in exemplary processes of data cleaning in which redundant information is exemplarily be removed e.g. by removing a copy-pasted comment from the same data source, parameters such as IP addresses may be used for the redundancy checks.

Also, for example, the database/dictionary may be further enriched, e.g. by classifying with pre-defined meta-attributes, e.g. language, region, nature of the term (numb, verb, adjective, adverb etc.). Such meta-data attributes may be considered during machine learning phases for fine tuning of the data dictionary, e.g. to fine-tune the database/dictionary for terms being used in local language for regional applications.

In some exemplary embodiments, threshold values may be adjusted dynamically and further improved. For example, the threshold values definition may consider e.g. credibility of the data source (e.g. whether it is a social network or a professional forum). In addition, machine learning potentially used to refine the data dictionary may also apply to fine-tuning of the threshold value(s) of one or more criteria above.

Also, exemplary embodiments, a validation processing may be further improved, e.g. by performing logical text validation e.g. validation of a failure detection by the appearance of at least one noun, one verb with a set of adverbs (regions, time etc.) and adjectives (weather condition).

As will be appreciated by one of skill in the art, aspects and exemplary embodiments, as described hereinabove and in connection with the accompanying figures, may be embodied as a method (e.g., a computer-implemented process), apparatus (including a device, machine, system, computer program product, and/or any other apparatus), or a combination of the foregoing. Embodiments of the present invention may take the form of a computer program product on a computer-readable medium having computer-executable program code embodied in the medium.

Embodiments are described exemplarily hereinabove with reference to flowchart illustrations and/or block diagrams of methods and apparatuses, and with reference to a number of sample views of a graphical user interface generated by the methods and/or apparatuses. It will be understood that each block of the flowchart illustrations and/or block diagrams, and/or combinations of blocks in the flowchart illustrations and/or block diagrams, as well as the graphical user interface, can be implemented by computer-executable program code.

The computer-executable program code may be provided to a processor of a general purpose computer, special purpose computer, or other programmable data processing apparatus to produce a particular machine, such that the program code, which executes via the processor of the computer or other programmable data processing apparatus, generate means for implementing the functions/acts/outputs specified in the flowchart, block diagram block or blocks, figures, and/or written description.

These computer-executable program code may also be stored in a computer-readable memory that can direct a computer or other programmable data processing apparatus to function in a particular manner, such that the program code stored in the computer readable memory produce an article of manufacture including instruction means which implement the function/act/output specified in the flowchart, block diagram block(s), figures, and/or written description.

The computer-executable program code may also be loaded onto a computer or other programmable data processing apparatus to cause a series of operational steps to be performed on the computer or other programmable apparatus to produce a computer-implemented process such that the program code which executes on the computer or other programmable apparatus provides steps for implementing the functions/acts/outputs specified in the flowchart, block diagram block(s), figures, and/or written description. Alternatively, computer program implemented steps or acts may be combined with operator or human implemented steps or acts in order to carry out an embodiment of the invention.

Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages generated, transmitted, received, stored, and/or processed by the device), and such messages may be conveyed by a communication network or medium.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof Computer program logic implementing some or all of the described functionality is typically implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator).

Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Computer program logic implementing all or part of the functionality previously described herein may be executed at different times on a single processor (e.g., concurrently) or may be executed at the same or different times on multiple processors and may run under a single operating system process/thread or under different operating system processes/threads.

Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies.

The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Any suitable computer readable medium may be utilized. The computer readable medium may be, for example but not limited to, an electronic, magnetic, optical, electromagnetic, infrared, or semiconductor system, apparatus, device, or medium.

More specific examples of the computer readable medium include, but are not limited to, an electrical connection having one or more wires or other tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device.

The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies.

The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

While certain exemplary embodiments have been described and shown in the accompanying drawings, it is to be understood that such embodiments are merely illustrative of and are not restrictive on the broad invention, and that the embodiments of invention are not limited to the specific constructions and arrangements shown and described, since various other changes, combinations, omissions, modifications and substitutions, in addition to those set forth in the above paragraphs, are possible.

Those skilled in the art will appreciate that various adaptations, modifications, and/or combination of the just described embodiments can be configured without departing from the scope and spirit of the invention. Therefore, it is to be understood that, within the scope of the appended claims, the invention may be practiced other than as specifically described herein. For example, unless expressly stated otherwise, the steps of processes described herein may be performed in orders different from those described herein and one or more steps may be combined, split, or performed simultaneously.

The invention claimed is:

1. A method for an automated data analysis, comprising:
providing one or more databases indicative of a plurality of keywords;
providing analysis input data obtained from one or more data sources, and pre-processing the analysis input data to generate pre-processed analysis input data available for data analysis processing, the analysis input data including a plurality of text documents respectively being associated with at least one of a plurality of data samples;
performing data analysis processing of the pre-processed analysis input data, including:
word count processing to determine word count numbers indicative of occurrence frequencies for keywords of the one or more databases in the text documents of the pre-processed analysis input data for each of the plurality of data samples,
correlation determination processing to determine, for each of a plurality of keyword pairs, a respective correlation coefficient being associated with the respective keyword pair, the respective correlation coefficient being indicative of a quantitative measure of correlation between the determined word count numbers of the keywords of the respective keyword pair for the plurality of data samples,
correlation-link identification processing to identify correlation-linked keyword pairs, wherein keywords of a keyword pair are determined to be correlation-linked to each other based on a correlation criteria, the correlation criteria including a criteria whether the determined correlation coefficient associated with the respective keyword pair exceeds a correlation threshold, and correlation group identification processing to identify correlation groups of keywords based on the identified correlation-linked keyword pairs, each correlation group including keywords of at least one correlation-linked keyword pair and, for each keyword included in the respective correlation group, the respective correlation group further includes the other keywords identified to be correlation-linked to the respective keyword; and outputting, if one or more correlation groups of keywords are identified, analysis result data indicative of at least one of the one or more identified correlation groups of keywords, the data analysis processing further includes:
   omitting keywords, which fail to meet a frequency criteria, prior to the correlation determination processing;
the frequency criteria including a criteria of whether the determined word count number for the respective keyword for at least one of the data samples exceeds a frequency threshold and/or a criteria of whether an average word count number for the respective keyword for the plurality of data samples exceeds the frequency threshold,
adjusting the frequency threshold applied to the determined word count numbers for a certain data sample based on a total number of text documents being associated with the certain data sample;
adjusting the frequency threshold applied to determined average word count numbers for the plurality of data samples based on a total number of text documents of the plurality of data samples; and
adjusting the frequency threshold based on one or more credibility weighting factors indicative of a credibility level of one or more users as creators of one or more of the text documents and/or of a credibility level of one or more data sources.

2. The method according to claim 1, wherein
the data analysis processing further includes:
   distance determination processing to determine, for each of the plurality of keyword pairs, a respective distance coefficient being associated with the respective keyword pair, the respective distance coefficient being indicative of a relative distance of the keywords of the respective keyword pair in each respective text document of the pre-processed analysis input data;
wherein the correlation criteria applied in the correlation-link identification processing further includes a criteria whether the determined distance coefficient associated with the respective keyword pair exceeds a distance threshold.

3. The method according to claim 2, wherein
the distance coefficient being associated with the respective keyword pair is determined in a range between a maximum distance coefficient value, which indicates that the keywords of the respective keyword pair occur together, in particular close or next to each other, in plural text documents, and a minimum distance coefficient value, which indicates that the keywords of the respective keyword pair do not occur together in any of the text documents.

4. The method according to claim 2, wherein
the providing one or more databases comprises:
providing a first database indicative of a plurality of keywords for the word count processing performed for the correlation determination processing, and providing a second database indicative of a plurality of keywords for the word count processing performed for the distance determination processing,
wherein the second database includes all keywords included in the first database and additional keywords not included in the first database;
wherein the method further includes a machine learning process which comprises:
updating the first database by adding one or more keywords from the second database to the first database, if the distance determination processing identifies one or more keyword pairs which fulfill the criteria whether the determined distance coefficient associated with the respective keyword pair exceeds a distance threshold and which include a respective keyword which is already included in the first database and another respective keyword which was previously not included in the first database; and
repeating the word count processing for the correlation determination processing and the correlation determination processing based on the one or more added keywords of the updated first database.

5. The method according to claim 1, wherein
at least one of the one or more databases includes a plurality of search terms being surjectively mapped onto the plurality of keywords, such that each search term is mapped to one of the plurality of keywords and each keyword is associated with one or more of the plurality of search terms being mapped to the respective keyword;
wherein the pre-processing to generate the pre-processed analysis input data includes identifying occurrences of search terms in the text documents and replacing the identified search terms by their respective associated keywords based on the at least one of the one or more databases; and
wherein word count processing includes determining word count numbers indicative of occurrence frequencies for search terms of the at least one of the one or more databases in the text documents of the pre-processed analysis input data for each of the plurality of data samples, and adding, for each of the plurality of data samples, the determined word count numbers for all search terms mapped to the same keyword to determine the respective word count number for the respective keyword.

6. The method according to claim 5, further comprising
analyzing correlation groups of the analysis result data and adjusting the mapping between search terms and keywords based on machine learning on the basis of the analysis of the analysis result data.

7. The method according to claim 1, wherein
at least one of the one or more databases is grouped into plural categories, each keyword being associated with one of the plural categories;
the categories including one or more of:
a manufacturer category including keywords associated with manufacturer's names, in particular names of automotive manufacturers,
a product category including keywords associated with products or product models, in particular automobile models,
a part category including keywords associated with parts of products or product models, in particular automobile parts,
a malfunction category including keywords associated with product malfunction or failures, a category including keywords associated with problems being resolved and/or normal functioning of a product or product part, a weather category including keywords associated with weather attributes, a location category including keywords associated with locations, in particular regions, countries, states, and/or cities, a road type category including keywords associated with road types and/or road conditions, a driving maneuver action category including keywords associated with driving maneuver actions performed by a vehicle and/or by a driver of the vehicle, and a problem-solution-feedback category including keywords associated with one or more solutions to one or more problems.

8. The method according to claim 1, further comprising:
grouping at least one of the one or more databases into plural categories, each keyword being associated with one of the plural categories; and
identifying one or more correlation groups of keywords which contain at least one keyword being associated with each of a pre-determined set of two of more categories of the at least one of the one or more databases.

9. The method according to claim 1, further comprising:
adjusting the correlation criteria based on one or more of the criteria:
if no correlation-linked keyword pair is identified in the correlation-link identification processing,
if no correlation group is identified in the correlation group identification processing,
if the maximum number of keywords occurring in the identified correlation groups is lower than a pre-set threshold, and
if the average number of keywords in the identified correlation groups is lower than a pre-set threshold; and
repeating the correlation-link identification processing and the correlation group identification processing based on the adjusted correlation criteria.

10. The method according to claim 8, further comprising:
adjusting the correlation criteria if no correlation group, which contains at least one keyword being associated with each or at least a pre-determined number of categories of a pre-determined set of two or more categories of the database, is identified; and
repeating the correlation-link identification processing and the correlation group identification processing based on the adjusted correlation criteria.

11. The method according to according to claim 9, further comprising:
adjusting the correlation threshold, a frequency threshold, and/or a distance threshold.

12. A computer program product including computer program instructions stored on a computer-readable medium which, when executed on a computer or computer system, are configured to execute, on the computer or computer system, the steps of a method according to claim 1.

13. An apparatus including a non-transitory computer readable medium coupled to a processor for executing an automated data analysis, comprising:
a storage configured to store one or more databases indicative of a plurality of keywords;
a data input interface configured to provide analysis input data obtained from one or more data sources, the analysis input data including a plurality of text documents respectively being associated with at least one of a plurality of data samples;
a processing system executed by one or more processors, configured to execute pre-processing the analysis input data to generate pre-processed analysis input data available for data analysis processing, and the processing system being configured to execute the data analysis processing of the pre-processed analysis input data, including:
word count processing to determine word count numbers indicative of occurrence frequencies for keywords of the one or more databases in the text documents of the pre-processed analysis input data for each of the plurality of data samples,
correlation determination processing to determine, for each of a plurality of keyword pairs, a respective correlation coefficient being associated with the respective keyword pair, the respective correlation coefficient being indicative of a quantitative measure of correlation between the determined word count numbers of the keywords of the respective keyword pair for the plurality of data samples,
correlation-link identification processing to identify correlation-linked keyword pairs, wherein keywords of a keyword pair are determined to be correlation-linked to each other based on a correlation criteria, the correlation criteria including a criteria whether the determined correlation coefficient associated with the respective keyword pair exceeds a correlation threshold, and
correlation group identification processing to identify correlation groups of keywords based on the identified correlation-linked keyword pairs, each correlation group including keywords of at least one correlation-linked keyword pair and, for each keyword included in the respective correlation group, the respective correlation group further includes the other keywords identified to be correlation-linked to the respective keyword;
a data output interface configured to output, if one or more correlation groups of keywords are identified, analysis result data indicative of at least one of the one or more identified correlation groups of keywords,
wherein the data analysis processing further includes:
omitting keywords, which fail to meet a frequency criteria, prior to the correlation determination processing;
the frequency criteria including a criteria whether the determined word count number for the respective keyword for at least one of the data samples exceeds a frequency threshold and/or a criteria whether an average word count number for the respective keyword for the plurality of data samples exceeds the frequency threshold,
adjusting the frequency threshold applied to determined word count numbers for a certain data sample based on a total number of text documents being associated with the certain data sample;
adjusting the frequency threshold applied to determined average word count numbers for the plurality of data samples based on a total number of text documents of the plurality of data samples; and
adjusting the frequency threshold based on one or more credibility weighting factors indicative of a credibility level of one or more users as creators of one or more of the text documents and/or of a credibility level of one or more data sources.

* * * * *